United States Patent
Kazui et al.

(10) Patent No.: US 9,591,305 B2
(45) Date of Patent: Mar. 7, 2017

(54) MOVING IMAGE DECODING APPARATUS, MOVING IMAGE DECODING METHOD AND MOVING IMAGE ENCODING APPARATUS, AND MOVING IMAGE ENCODING METHOD

(71) Applicant: FUJITSU LIMITED, Kawasaki (JP)

(72) Inventors: Kimihiko Kazui, Kawasaki (JP); Junpei Koyama, Shibuya (JP); Hidenobu Miyoshi, Kawasaki (JP); Satoshi Shimada, Kawasaki (JP); Akira Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 765 days.

(21) Appl. No.: 13/740,459

(22) Filed: Jan. 14, 2013

(65) Prior Publication Data
US 2013/0128981 A1    May 23, 2013

Related U.S. Application Data

(63) Continuation of application No. PCT/JP2010/062266, filed on Jul. 21, 2010.

(30) Foreign Application Priority Data

Jul. 15, 2010    (JP) ................................. 2010-061996

(51) Int. Cl.
H04N 19/00    (2014.01)
H04N 19/50    (2014.01)
(Continued)

(52) U.S. Cl.
CPC ..... *H04N 19/00569* (2013.01); *H04N 19/105* (2014.11); *H04N 19/107* (2014.11);
(Continued)

(58) Field of Classification Search
CPC ........... H04N 19/00569; H04N 19/105; H04N 19/107; H04N 19/117; H04N 19/156;
(Continued)

(56) References Cited

U.S. PATENT DOCUMENTS 4,651,206 A    3/1987    Ohki
2002/0141503 A1 *  10/2002  Kobayashi et al. ..... 375/240.27
(Continued)

FOREIGN PATENT DOCUMENTS

JP    60-146588    8/1985
JP    6-113286    4/1994
(Continued)

OTHER PUBLICATIONS

Richardson, "H.264 and MPEG-4 Video Compression", 2003, Wiley, pp. 1-306.*
(Continued)

*Primary Examiner* — Peter D Le
(74) *Attorney, Agent, or Firm* — Staas & Halsey LLP

(57) ABSTRACT

A moving image decoding apparatus includes a region boundary position information extracting unit which extracts region boundary position information between a clean region including at least one block encoded such that a pixel value is guaranteed to be decoded correctly, and a non-clean region, a region classification unit which specifies the clean region and the non-clean region in each picture based on the region boundary position information, a referenceability determining unit which, when a decoding target block belongs to the clean region, determines that blocks in the clean region in the decoding target picture and blocks in the clean region in the reference picture are referenceable, and, when the decoding target block belongs to the non-clean region, determines that all of blocks of the decoding target picture and the reference picture are referenceable,
(Continued)

and a decoding unit which decodes the decoding target block with reference to only the referenceable blocks.

16 Claims, 19 Drawing Sheets

(51) Int. Cl.
| | | |
|---|---|---|
| *H04N 19/105* | (2014.01) | |
| *H04N 19/52* | (2014.01) | |
| *H04N 19/176* | (2014.01) | |
| *H04N 19/593* | (2014.01) | |
| *H04N 19/107* | (2014.01) | |
| *H04N 19/117* | (2014.01) | |
| *H04N 19/156* | (2014.01) | |
| *H04N 19/182* | (2014.01) | |
| *H04N 19/174* | (2014.01) | |
| *H04N 19/17* | (2014.01) | |
| *H04N 19/55* | (2014.01) | |
| *H04N 19/86* | (2014.01) | |
| *H04N 19/59* | (2014.01) | |

(52) U.S. Cl.
CPC ......... *H04N 19/117* (2014.11); *H04N 19/156* (2014.11); *H04N 19/17* (2014.11); *H04N 19/174* (2014.11); *H04N 19/176* (2014.11); *H04N 19/182* (2014.11); *H04N 19/52* (2014.11); *H04N 19/55* (2014.11); *H04N 19/59* (2014.11); *H04N 19/593* (2014.11); *H04N 19/86* (2014.11)

(58) Field of Classification Search
CPC .... H04N 19/17; H04N 19/174; H04N 19/176; H04N 19/182; H04N 19/52; H04N 19/55; H04N 19/59; H04N 19/593; H04N 19/86
See application file for complete search history.

(56) References Cited

U.S. PATENT DOCUMENTS

| | | | |
|---|---|---|---|
| 2004/0008787 A1* | 1/2004 | Pun et al. | 375/240.25 |
| 2005/0201470 A1 | 9/2005 | Sievers | |
| 2006/0233239 A1* | 10/2006 | Sethi et al. | 375/240.03 |
| 2008/0008250 A1* | 1/2008 | Mori et al. | 375/240.24 |
| 2008/0095246 A1* | 4/2008 | Luo et al. | 375/240.27 |
| 2008/0225956 A1* | 9/2008 | Kusakabe | 375/240.24 |
| 2008/0260046 A1* | 10/2008 | Zhang et al. | 375/240.27 |
| 2009/0028246 A1 | 1/2009 | Miyoshi et al. | |
| 2010/0172412 A1 | 7/2010 | Shimada et al. | |
| 2010/0283892 A1* | 11/2010 | Zhou et al. | 348/441 |
| 2010/0303153 A1* | 12/2010 | Kadono | 375/240.13 |

FOREIGN PATENT DOCUMENTS

| | | | |
|---|---|---|---|
| JP | 2003-179938 | 6/2003 | |
| JP | 2005-260936 | 9/2005 | |
| JP | 2009-21908 | 1/2009 | |
| JP | 2009-95064 | 4/2009 | |
| WO | 2009/037726 | 3/2009 | |
| WO | 2009/037726 A1 | 3/2009 | |
| WO | WO 2009/069316 A1 * | 6/2009 | H04N 7/32 |

OTHER PUBLICATIONS

International Search Report of PCT/JP2010/062266 mailed Aug. 17, 2010.

J. Jung et al., "Competition-Based Scheme for Motion Vector Selection and Coding", VCEG-AC06, ITU-T SG16/Q.6, 29$^{th}$ Meeting, Jul. 2006, 7 pp.

Japanese Office Action mailing on Apr. 1, 2014 in corresponding Japanese Patent Application No. 2012-524394.

* cited by examiner

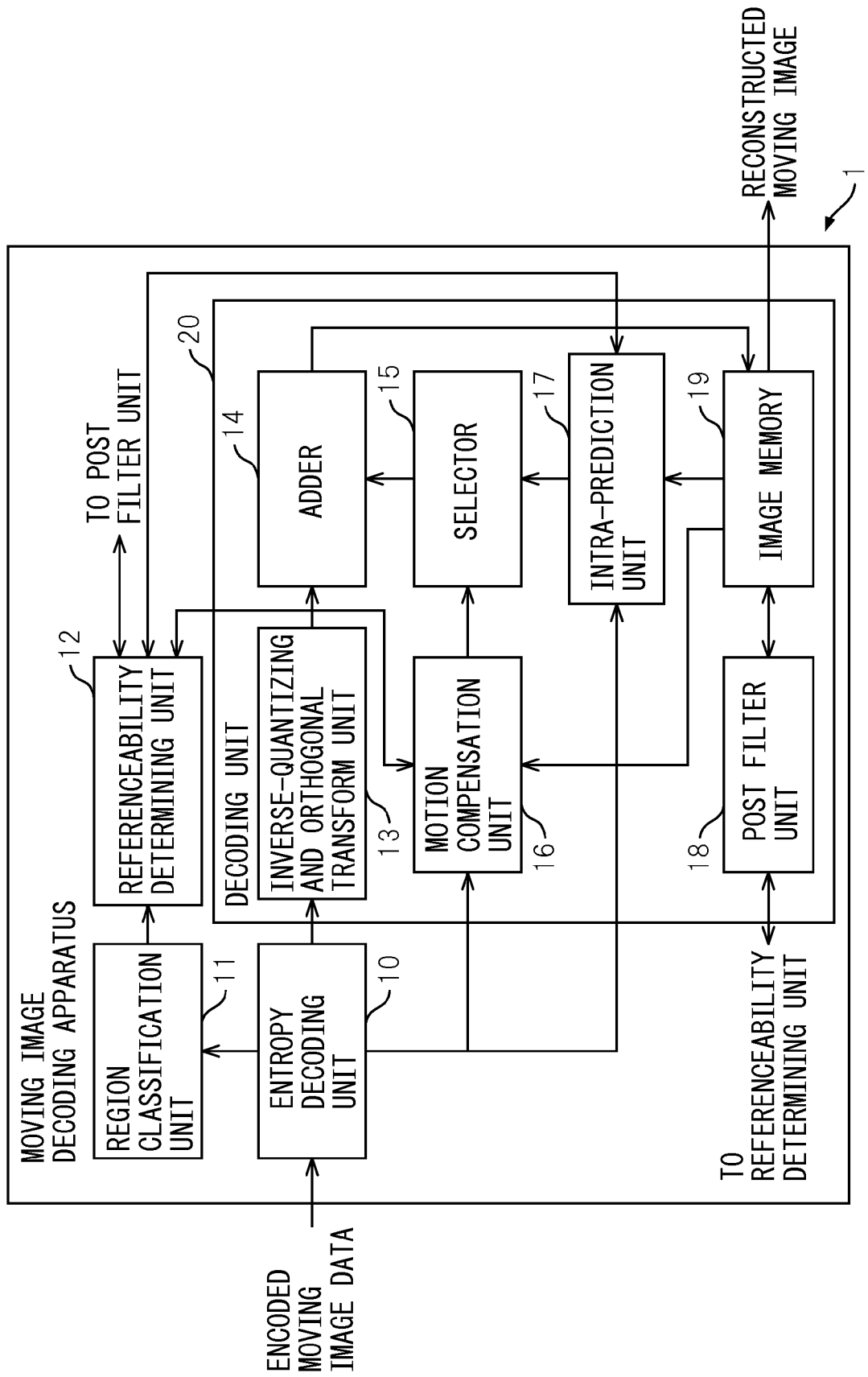

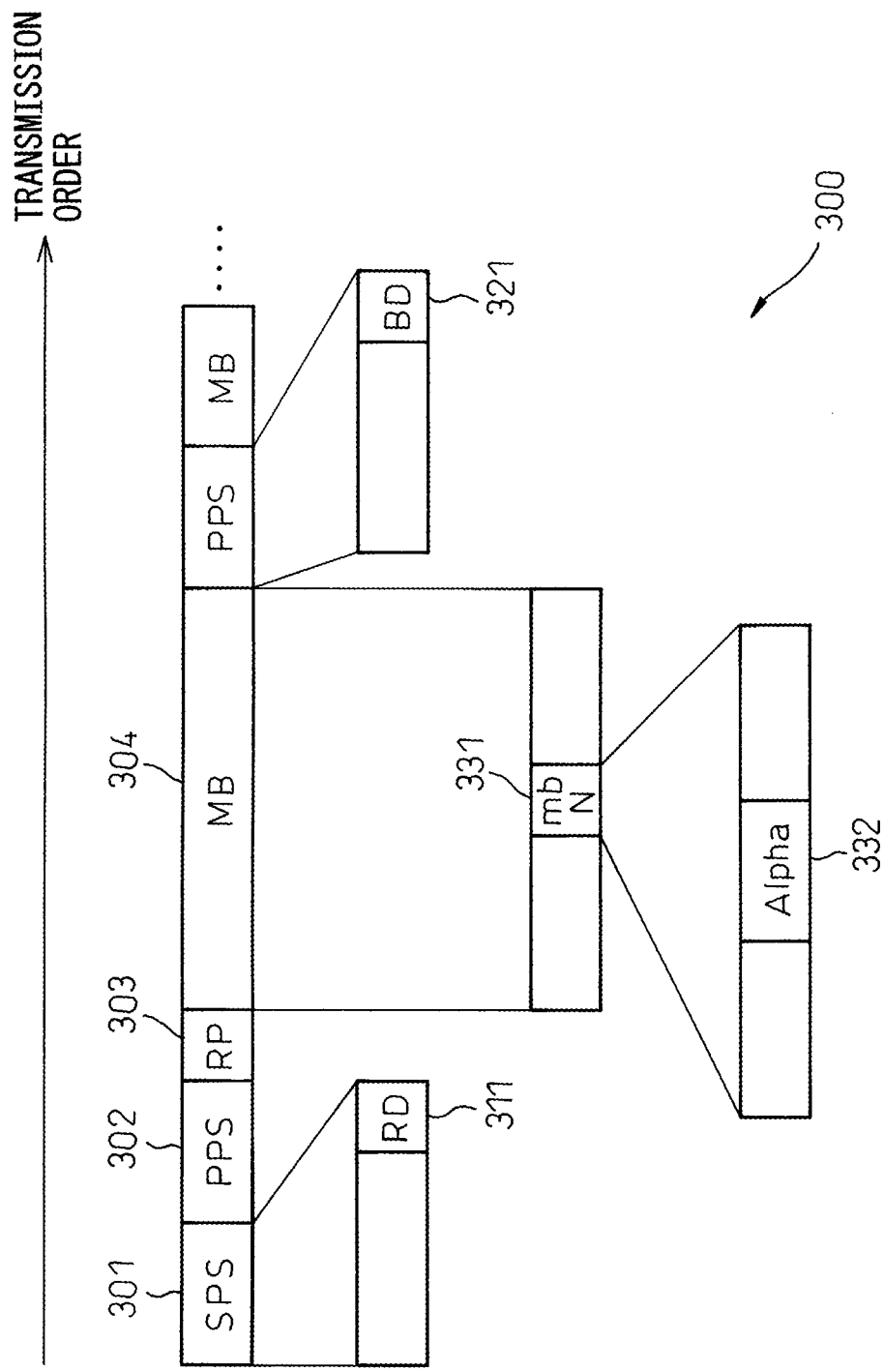

(T-1)

T

FIG.8A
FIG.8B
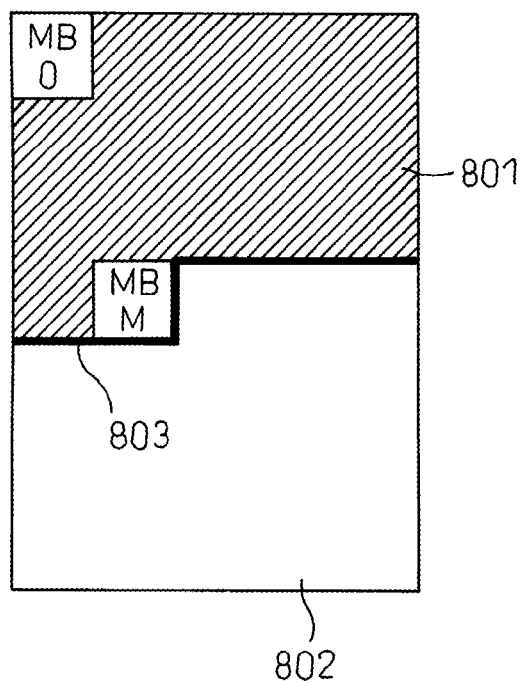
(T-1)
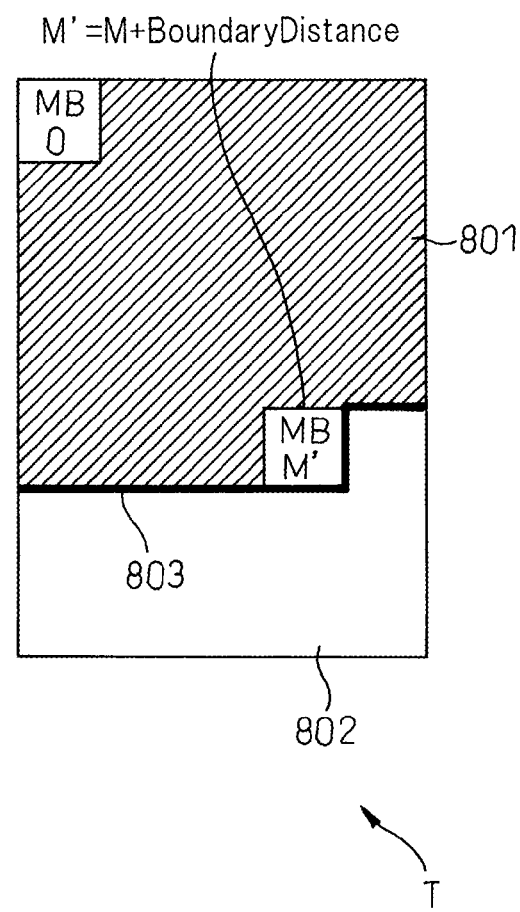
T

MOVING IMAGE DECODING APPARATUS, MOVING IMAGE DECODING METHOD AND MOVING IMAGE ENCODING APPARATUS, AND MOVING IMAGE ENCODING METHOD

CROSS-REFERENCE TO RELATED APPLICATION

This application is a continuation application and is based upon PCT/JP2010/062266, filed on Jul. 21, 2010, the entire contents of which are incorporated herein by reference.

FIELD

The embodiments discussed herein are related to a moving image decoding apparatus and a moving image decoding method which decode a moving image in which blocks in a picture are encoded using information of other blocks, and a moving image encoding apparatus or a moving image encoding method which encode blocks in a picture using information of other blocks.

BACKGROUND

Generally, the amount of moving image data is very large. Therefore, when an apparatus for handling moving image data transmits the moving image data to other apparatuses or stores the moving image data in a storage device, the apparatus compresses the amount of data by encoding the moving image data. As typical moving image encoding standards, Moving Picture Experts Group phase 2 (MPEG-2), MPEG-4, and H.264 MPEG-4 Advanced Video Coding (MPEG-4 AVC/H.264), set forth by International Standardization Organization/International Electrotechnical Commission (ISO/IEC), are widely used. Such encoding standards employ an inter-coding method for encoding an encoding target picture, using the encoding target picture and information of pictures before and after the target picture, and an intra-coding method for carrying out the encoding using only information which the encoding target picture has.

The inter-coding method searches for parts of high correlation between the encoding target picture and a reference picture. Then, the inter-coding method encodes a motion vector which represents the difference in position between the encoding target picture and the reference picture, and the differences (referred to as "prediction error") between the values of corresponding pixels in the two pictures. Generally, the correlation between pictures is high in a moving image, and therefore the prediction error is lower than the original pixel values. As a result, the inter-coding method is able to realize high compression rate. However, in the inter-coding method, the error that is produced when encoding a certain picture spreads to the encoding of pictures that are encoded after the picture. Consequently, when a plurality of pictures are encoded consecutively using the inter-coding method, pictures that are encoded later in the sequence have poorer quality. In addition, when a picture that serves as a reference is not available, such as when encoded moving image data is acquired from the middle, the moving image decoding apparatus cannot decode an inter-picture that is inter-coded, based on the reference picture.

On the other hand, an intra-picture that is encoded by the intra-coding method allows the pixel values to be decoded correctly, without referencing the decoding results of other pictures. Consequently, the intra-coding method is used to encode the first picture in moving image data and pictures in the middle in a predetermined cycle. By making a picture in the middle an intra-picture, even when the moving image decoding apparatus starts the decoding process from the middle of encoded moving image data, the moving image decoding apparatus is able to correctly reconstruct each picture after the intra-picture. Note that, when the decoding operation is started from a given picture and the pixel value can be decoded correctly in the picture or in a picture that is a predetermined time later, the picture where the decoding operation is started is referred to as a "refresh picture." However, the compression rate of the intra-coding method is generally lower than the compression rate of the inter-coding method. Consequently, to maintain the image quality of an intra-picture and the image quality of an inter-picture after decoding approximately equal, generally, the amount of information of the intra-picture is greater than the amount of information of the inter-picture.

When encoded moving image data is handled, by encoding and decoding the moving image data there is a coding delay. The coding delay refers to the time from when a picture is input in the moving image encoding apparatus to when the picture is output from the moving image decoding apparatus. In applications that transmit and reconstruct moving image data on a real time basis such as bi-directional communication applications like remote television conference systems, reducing the coding delay is very important. To allow the user to use such applications without being inconvenienced, the coding delay is preferably approximately 100 milliseconds or less.

To make the coding delay approximately 100 milliseconds or less, it is preferable to make the encoding order of pictures and the time order of the pictures match and also minimize the buffering delay, which is one of the major causes of delay in transmission and reception of encoded moving image data. The buffering delay is set to transmit an encoded moving image, in which the amount of information varies per picture, on a network having approximately the same transmission speed as the average amount of information in the encoded moving image per unit time. The buffering delay is the time to transmit the picture having the maximum amount of information in an encoded moving image stream, and is, for example, several to twenty frames in time. Consequently, in order to minimize the buffering delay, the amount of information is made substantially equal in each picture. As mentioned earlier, to make the image quality of each picture equal, the amount of information of an intra-picture is greater than the amount of information of an inter-picture. Consequently, simply making the amount of information of an intra-picture approximately the same as the amount of information of inter-picture in order to make the amount of information of each picture equal would only result in a significant drop in the image quality of the intra-picture. Consequently, the image quality of the inter-picture which uses the intra-picture as a reference picture also drops significantly, and, as a result, the image quality drops significantly over the entire moving image data.

As a method of making the amount of information substantially equal in each picture without damaging image quality much, an intra-slice scheme is proposed (see, for example, Japanese Laid-Open Patent Publication No. 2003-179938, Japanese Laid-Open Patent Publication No. 6-113286, Japanese Laid-Open Patent Publication No. 2005-260936, International Publication WO09/037,726 and Japanese Examined Patent Publication No. 6-101841). In the intra-slice scheme, pictures other than the first picture in the encoding target moving image data are not made intrapictures, and the macroblocks set to be intra-coded are inserted in each picture so as to circulate in the pictures in a predetermined cycle. The macroblocks set to be intra-coded are referred to as "intra-slice." The technique correctly decodes the part of the pictures in order and therefore is also referred to as "step-by-step refresh."

For example, when the direction of circulation moves from top to bottom in pictures, the picture in which the intra-slice is at the topmost is the refresh picture, and the pixel values are reconstructed correctly in order from the upper end of the pictures. In the picture where the intra-slice comes at the lowermost, the pixel values of the entire picture are correctly reconstructed. The interval of refresh pictures, i.e., the refresh cycle, is the same as the circulation cycle of intra-slices.

Note that, in practice, macroblocks in intra-slices do not necessarily have to be intra-coded. The macroblocks in the intra-slices have only to be encoded such that, when decoding is started from the refresh picture, the pixel values of the subsequent pictures are guaranteed to be correctly reconstructed. For example, the macroblocks in the intra-slices may be inter-coded using a motion vector which references the region in a picture where the pixel values are guaranteed to be reconstructed correctly (hereinafter the region will be referred to as "clean region").

However, when moving image data is encoded using the intra-slice scheme, in pictures before the picture that is refreshed by an intra-slice, there is a region where the pixel values are not guaranteed to be reconstructed correctly. Note that the region where the pixel values are not guaranteed to be correctly reconstructed will be hereinafter referred to as "non-clean region." When moving image data is encoded using the intra-slice scheme, to guarantee that the pixel values in the clean region are reconstructed correctly, there is a constraint that macroblocks in the clean region are unable to reference information of pixels in the non-clean region. For example, when an encoding target macroblock in the clean region is inter-coded, an entire block on the reference picture which the encoding target macroblock references has to be also included in the clean region.

In MPEG-4 AVC/H.264, in order to encode a motion vector, an average value (or median) of the motion vector of the upper or left neighboring macroblock of the encoding target block is calculated as a motion vector predicted value PMVMED. Then, the difference between the predicted value PMVMED and the motion vector of the encoding target macroblock is entropy-coded.

Furthermore, a technique for making the motion vector of the macroblock that is located on the reference picture in the same position as the encoding target macroblock be another PMVCOL, and making the one of PMVMED and PMVCOL that produces the smaller error be a predicted value has been proposed (see, for example, J. Jung and G. Laroche, "Competition-Based Scheme for Motion Vector Selection and Coding," VCEG-AC06, ITU-T SGI6/Q.6 29th Meeting). In this case, a flag indicating which of PMVMED and PMVCOL is selected is included in encoded moving image data.

In the technique, when a moving image decoding apparatus starts the decoding operation from a refresh picture, since there is no reference picture for the refresh picture on the decoding side, PMVCOL is not acquired, and, as a result, it is not possible to correctly decode the motion vectors in the non-clean region of the refresh picture. Note that the clean region of the refresh picture is intra-coded, and therefore incorrect reconstruction of motion vectors does not occur.

The pictures after the refresh picture also reference the motion vectors of the reference pictures (including the refresh picture), and therefore the influence of incorrect motion vector reconstruction spreads. Consequently, when a macroblock in the clean region references PMVMED and PMVCOL as motion vector predicted values, since PMVMED and PMVCOL are not guaranteed to be decoded correctly, motion vectors are unable to be decoded correctly, and, as a result, the correct pixel values are not reconstructed. Consequently, in the intra-slice scheme, the encoding method that uses one of PMVMED and PMVCOL as a motion vector predicted value is not available for use.

In MPEG-4 AVC/H.264, an intra-prediction coding scheme to perform prediction coding of the encoding target macroblock using information of neighboring reference macroblocks that have been encoded earlier, is employed. When intra-prediction coding of the encoding target macroblock included in the clean region is performed, the reference macroblocks also have to be included in the clean region.

Furthermore, in MPEG-4 AVC/H.264, a deblocking filter process to remove the block distortion that is produced in the block boundaries by applying a low-pass filter in the boundaries with neighboring blocks is employed. Consequently, with the intra-slice scheme, all of the pixels which the deblocking filter applied to the pixels in the clean region reference, also have to be included in the clean region.

As described above, in the intra-slice scheme, all of the pixels referenced by the encoding target macroblock in the clean region also have to be included in the clean region. Due to such constraints, when the intra-slice scheme is applied to conventional coding schemes, the coding rate decreases. One reason is the increase in the amount of information due to inclusion of information representing the boundary between the clean region and the non-clean region (hereinafter referred to as "clean region boundary") in encoded moving image data streams. For example, in MPEG-4 AVC/H.264, between the macroblocks located in the clean region boundary, slice heeders representing the boundary are inserted. By inserting such slice headers, the amount of information to be included in encoded moving image streams increases, and therefore the coding rate decreases.

Furthermore, context adaptive binary arithmetic coding (CABAC) may be used as an entropy coding scheme for performing variable-length encoding of the quantization coefficient and motion vector of each macroblock. In this case, context is initialized in the positions where the slice headers are inserted, and therefore the rate of entropy coding decreases.

Furthermore, when a motion vector is encoded, the motion vector of a neighboring block is used as a predicted value, and the difference between the motion vector and the predicted value is encoded. However, it is not possible to use the motion vector of a block that is determined to belong to another slice by a slice header, as a predicted value. As a result, the rate of motion vector prediction decreases, and the coding rate decreases even lower.

Furthermore, in order to reduce the buffering delay, intra-slices may be inserted to cross the picture along the vertical direction, and the intra-slices may be set to circulate from the left to the right or from the right to the left. By setting intra-slices in this way, macroblocks to be intra-coded are distributed over each macroblock line, so that the amount of information of each macroblock lines becomes approximately uniform. Consequently, it is possible to limit the capacity of the buffer included in the moving image decoding apparatus corresponding to one macroblock line.

However, when tool kits such as Main Profile and High Profile, widely employed generally in MPEG-4 AVC/H.264, are used, macroblocks are encoded from the top to the bottom of the picture. Consequently, when intra-slices are inserted to cross the picture along the vertical direction, the slice headers have to be inserted per macroblock line, and the number of slice headers to be needed therefore increases. As a result, the coding rate decreases even lower.

Furthermore, to comply with the above constraints, the moving image encoding apparatus does not apply, to the entire picture, the method of encoding the motion vector of the encoding target macroblock using predicted values calculated from the motion vectors of other macroblocks of the reference pictures. Alternatively, the moving image encoding apparatus inserts slice headers for distinguishing the inapplicable macroblock set from other macroblocks, in encoded moving image streams. In either case, since the amount of coding information of motion vector increases, or the amount of information of slice headers to be inserted increases, the coding rate decreases.

Furthermore, when the encoding target picture that is included in the clean region is inter-coded, by the above constraints, the moving image encoding apparatus may not be able to set an optimal reference block that is the most similar to the encoding target picture. For example, when the intra-slice circulation direction differs from the direction of displacement of the image on the picture, part or all of the region on the reference picture that is the most similar to the encoding target picture included in the clean region is included in the non-clean region. In this case, the difference in pixel values between the encoding target picture and the reference block is not necessarily reduced, and therefore the coding rate decreases.

A technique for solving this problem is disclosed in International Publication WO09/037,726. In the technique, when a moving image is decoded and part of the region in a reference picture that is referenced by a motion vector is included in the non-clean region of the reference picture, the moving image decoding apparatus does not reference the pixel values in the non-clean region of the reference picture. Then, instead of the pixel values in the non-clean region of the reference picture, the moving image decoding apparatus uses reference values that are calculated by extrapolation calculation based on the pixel values of one edge of the intra-slices. However, when the region in the reference picture referenced by the motion vector is mostly included in the non-clean region, the differences between the reference values calculated by extrapolation and the corresponding pixel values of the encoding target picture increase, and therefore the coding rate by motion prediction does not improve.

SUMMARY

According to one embodiment, a moving image decoding apparatus for decoding moving image data that is encoded such that a clean region, which includes at least one block that is encoded such that a pixel value is guaranteed to be decoded correctly, occupies an entire picture in a predetermined cycle is provided. The moving image decoding apparatus includes: a region boundary position information extracting unit which extracts region boundary position information between the clean region and a non-clean region from encoded moving image data; a region classification unit which specifies the clean region and the non-clean region in each picture based on the region boundary position information; a referenceability determining unit which, when a decoding target block in a decoding target picture included in the encoded moving image data belongs to the clean region, determines that blocks in the non-clean region in the decoding target picture and blocks in the non-clean region in a reference picture are unreferenceable and blocks in the clean region in the decoding target picture and blocks in the clean region in the reference picture are referenceable, and which, when the decoding target block belongs to the non-clean region, determines that all of blocks of the decoding target picture and all of blocks of the reference picture are referenceable; and a decoding unit which decodes the decoding target block with reference to only the referenceable blocks.

Furthermore, according to another embodiment, a moving image decoding method for decoding moving image data that is encoded such that a clean region, which includes at least one block that is encoded such that a pixel value is guaranteed to be decoded correctly, occupies an entire picture in a predetermined cycle is provided. The moving image decoding method includes: extracting region boundary position information between the clean region and a non-clean region from encoded moving image data; specifying the clean region and the non-clean region in each picture based on the region boundary position information; when a decoding target block in a decoding target picture included in the encoded moving image data belongs to the clean region, determining that blocks in the non-clean region in the decoding target picture and blocks in the non-clean region in a reference picture are unreferenceable and blocks in the clean region in the decoding target picture and blocks in the clean region in the reference picture are referenceable, and, when the decoding target block belongs to the non-clean region, determining that all of blocks of the decoding target picture and all of blocks of the reference picture are referenceable; and decoding the decoding target block with reference to only the referenceable blocks.

According to yet another embodiment, a moving image encoding apparatus for encoding moving image data such that a clean region, which includes at least one block that is encoded such that a pixel value is guaranteed to be decoded correctly, occupies an entire picture in a predetermined cycle is provided. The moving image encoding apparatus includes: a region classification unit which determines the clean region and a non-clean region in the picture; a referenceability determining unit which, when an encoding target block in an encoding target picture belongs to the clean region, determines that blocks in the non-clean region in the encoding target picture and blocks in the non-clean region in a reference picture are unreferenceable and blocks in the clean region in the encoding target picture and blocks in the clean region in the reference picture are referenceable, and which, when the encoding target block belongs to the non-clean region, determines that all of blocks of the encoding target picture and all of blocks of the reference picture are referenceable; and an encoding unit which encodes the encoding target block with reference to only the referenceable blocks, and adds region boundary position information representing a boundary between the clean region and the non-clean region to the encoded moving image data.

According to yet another embodiment, a moving image encoding method for encoding moving image data such that a clean region, which includes at least one block that is encoded such that a pixel value is guaranteed to be decoded correctly, occupies an entire picture in a predetermined cycle is provided. The moving image encoding method includes:

determining the clean region and a non-clean region in the picture; when an encoding target block in an encoding target picture belongs to the clean region, determining that blocks in a non-clean region in the encoding target picture and blocks in a non-clean region in a reference picture are unreferenceable and blocks in the clean region in the encoding target picture and blocks in the clean region in the reference picture are referenceable, and, when the encoding target block belongs to the non-clean region, determining that all of blocks of the encoding target picture and all of blocks of the reference picture are referenceable; encoding the encoding target block with reference to only the referenceable blocks; and adding region boundary position information representing a boundary between the clean region and the non-clean region to the encoded moving image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a schematic configuration diagram of a moving image decoding apparatus according to one embodiment.

FIG. 3 is a diagram illustrating a structure of encoded moving image data.

FIG. 8A is a diagram illustrating an example of the clean region boundary in the picture (T−1) when RefreshDirection is "100."

FIG. 8B is a diagram illustrating an example of the clean region boundary in the picture T when RefreshDirection is "100."

DESCRIPTION OF EMBODIMENTS

A moving image decoding apparatus according to one embodiment will be illustrated below with reference to the accompanying drawings. The moving image decoding apparatus reconstructs encoded moving image data such that the clean region, which includes at least one block that is encoded to guarantee that the pixel value is decoded correctly, occupies the entire picture over a predetermined cycle. Unlike the conventional scheme of inserting slice headers, the moving image decoding apparatus determines the boundary between the non-clean region and the clean region in each picture by referencing the clean region boundary position information included in the encoded moving image data, and performs decoding without referencing the blocks in the non-clean region to decode the blocks in the clean region. In entropy decoding, the moving image decoding apparatus does not initialize the CABAC context in the clean region boundary. By this means, the moving image decoding apparatus guarantees correct pixel value decoding in the clean region and also improves the coding rate.

Note that a picture may be either a frame or a field. A frame is one still image in moving image data, whereas a field is a still image that is acquired by extracting only the data of odd-numbered rows or the data of even-numbered rows from the frame. Furthermore, an encoded moving image may be a color moving image or may be a monochrome moving image.

Figure 1:
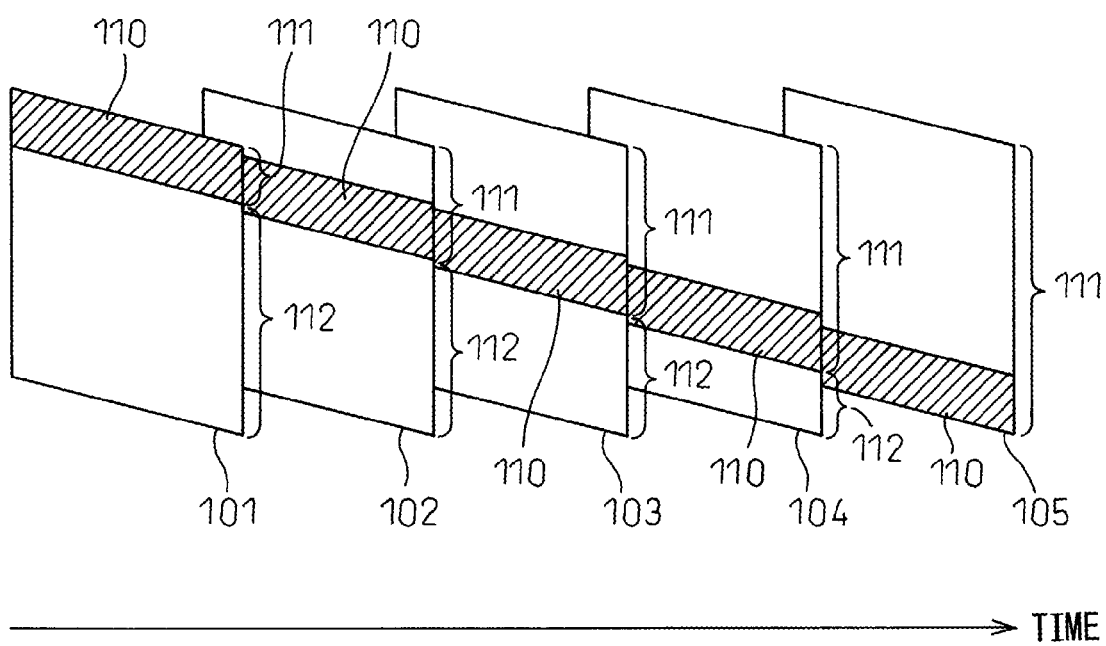
FIG. 1 is a diagram illustrating an example of the position of the clean region and the circulation direction in each picture, with respect to encoded moving image data to be reconstructed by a moving image decoding apparatus according to one embodiment.

FIG. 1 is a diagram illustrating an example of transition of the clean region boundary position and the region boundary position in each picture, with respect to moving image data that is reconstructed by the moving image decoding apparatus according to one embodiment and that is encoded such that the clean region, which includes at least one block that is encoded to guarantee that the pixel value is decoded correctly, occupies the entire picture over a predetermined cycle. Among the pictures 101 to 105 illustrated in FIG. 1, the picture 101 that is located in the leftmost position is the oldest picture, and the pictures that are located in the right side positions are pictures that come later in time. Each picture is encoded by referencing pictures that are earlier in time than itself. In other words, the pictures are reconstructed in the order of time.

Furthermore, each picture includes an expanded clean region 110, a clean region 111, and a non-clean region 112 that cross the picture along the horizontal direction. The expanded clean region 110 is included in the clean region, and is a region that expands from the clean region 111 of the picture that precedes itself in time. The macroblocks in the expanded clean region 110 are encoded by intra-coding or inter-coding. The region other than the clean region 111—in the present example, the region below the clean region 111—is the non-clean region 112.

A plurality of macroblocks included in the clean region 111 are encoded to guarantee that the correct pixel values are decoded, using information in the picture including the clean region 111 or information of the clean region of the immediately previous picture. Then, in the present example, in the picture 101, the clean region 111 is located in the upper end of the picture. In the picture, the expanded clean region 110 and the clean region 111 are the same. In other words, regions in pictures that precede the picture 101 itself in time are all regarded as non-clean regions. The boundary between the clean region 111 and the non-clean region 112 moves from top to bottom as time passes. Then, in the picture 105, the clean region 111 occupies the entire picture. In other words, the pixels values of the entire picture are correctly decoded. Note that, in the next picture of the picture 105 (not illustrated), the clean region is again located in the upper end of the picture as in the picture 101. In this way, in the present example, the refresh cycle is 5. Furthermore, the refresh picture is, for example, a picture where the clean region 111 and the expanded clean region 110 representing the same region are set in either end on a picture, and where, in the next picture, the boundary between the clean region 111 and the non-clean region 112 moves toward the center of the picture. In the present example, the picture 101, in which the clean region 111 and the expanded clean region 110 representing the same region are located in the upper end of the picture, is the refresh picture.

FIG. 2 is a schematic configuration diagram of the moving image decoding apparatus according to one embodiment. The moving image decoding apparatus 1 includes an entropy decoding unit 10, a region classification unit 11, a referenceability determining unit 12, and a decoding unit 20. Furthermore, the decoding unit 20 includes an inverse-quantizing and orthogonal transform unit 13, an adder 14, a selector 15, a motion compensation unit 16, an intra-prediction unit 17, a post filter unit 18, and an image memory 19.

The units included in the moving image decoding apparatus 1 are each formed as a separate circuit. Alternatively, the units included in the moving image decoding apparatus 1 may be installed in the moving image decoding apparatus 1 as one integrated circuit, in which circuits corresponding to the individual units are integrated. Furthermore, the units included in the moving image decoding apparatus 1 may be function modules to be realized by a computer program to be executed on a processor included in the moving image decoding apparatus 1.

The moving image decoding apparatus 1 acquires a data stream to include encoded moving image data via, for example, a communication network and an interface circuit (not illustrated) for connecting the moving image decoding apparatus 1 to the communication network. Then, the moving image decoding apparatus 1 stores the encoded moving image data extracted from the data stream in a buffer memory (not illustrated). The moving image decoding apparatus 1 reads encoded moving image data from the buffer memory per predetermined unit—for example, per macroblock line or per picture—and inputs the read data in the entropy decoding unit 10.

In the encoded moving image data, the entropy decoding unit 10 decodes data such as macroblock data that is encoded according to a predetermined entropy coding scheme. Note that the predetermined entropy coding scheme may be a Huffman coding scheme or an arithmetic coding scheme. Furthermore, the entropy decoding unit 10 extracts various parameters used to decode moving image data from the encoded moving image data.

FIG. 3 is a diagram illustrating the structure of the encoded moving image data. The encoded moving image data 300 includes sequence parameters 301, picture parameters 302, a recovery point 303, and macroblock data 304. Note that the parameters that have not been particularly illustrated in relation to the encoded moving image data 300 may be, for example, the same parameters as the parameters defined in the MPEG-4 AVC/H.264 standard.

The sequence parameters (Sequence Parameter Set: SPS) 300 include parameters that are common between a plurality of pictures, such as the screen size and the frame rate of the moving image. The SPS 300 is attached to each refresh picture and/or the like in the encoded moving image data. In the present embodiment, the SPS 300 is attached to the refresh picture.

In addition, the SPS 300 includes circulation direction information (Refresh Direction: RD) 311. The RD 311 is an example of information included in the clean region boundary position information, and represents the circulation direction of the clean region boundary in pictures. In the present embodiment, the RD 311 has a three-bit signal RefreshDirection. The meaning of RefreshDirection is defined as follows.

"000": The clean region boundary moves from top to bottom in pictures. In other words, the expanded clean region is set to cross the pictures horizontally, and the clean region boundary moves from top to bottom as time passes. When the clean region boundary reaches the lower end of a picture, in the next picture, the expanded clean region is set in the upper end of the picture.

"001": The clean region boundary moves from bottom to top in pictures. In other words, the expanded clean region is set to cross the pictures horizontally, and the clean region boundary moves from bottom to top as time passes. When the clean region boundary reaches the upper end of a picture, in the next picture, the expanded clean region is set in the lower end of the picture.

"010": The clean region boundary moves from the left to the right in pictures. In other words, the expanded clean region is set to cross the pictures vertically, and the clean region boundary moves from the left to the right as time passes. When the clean region boundary reaches the right end of a picture, in the next picture, the expanded clean region is set in the left end of the picture.

"011": The clean region boundary moves from the right to the left in pictures. In other words, the expanded clean region is set to cross the pictures vertically, and the clean region boundary moves from the right to the left as time passes. When the clean region boundary reaches the left end of a picture, in the next picture, the expanded clean region is set in the right end of the picture.

"100": The clean region boundary moves from the top position of a picture, following the order of raster scan. In other words, the expanded clean region is set as one or a plurality of macroblocks that are aligned horizontally, and the clean region boundary moves following the order of raster scan as time passes. When the clean region boundary reaches the lower right end of a picture, in the next picture, the expanded clean region is set in the upper left end of the picture.

The picture parameters (Picture Parameter Set: PPS) 302 include coding parameters that are set per picture, such as the entropy coding mode representing the entropy coding scheme etc. The PPS 302 is attached per picture. Furthermore, the PPS 302 includes information relating to the amount of boundary displacement (Boundary Distance: BD) 321. The BD 321 is an example of information that is included in the clean region boundary position information, and represents the amount of displacement between the position of the clean region boundary in the previous picture of the decoding target picture, and the position of the clean region boundary in the decoding target picture. For example, the BD 321 represents the amount of displacement of the clean region boundary in macroblock units or in pixel units.

The recovery point (Recovery Point: RP) 303 includes the number of pictures up to the picture immediately after the picture in which the values of all pixels included in the picture can be reconstructed correctly, and is attached to the refresh pictures. In the present embodiment, the RP 303 is attached to each refresh picture, and the value is the number of pictures corresponding to the refresh cycle.

The macroblock data (Macroblock: MB) 304 is generated per picture, and includes encoded data of all macroblocks in one picture. The MB 304 includes data mb 331, provided per macroblock, for the number of macroblocks included in the picture. Then, the MB 304 is encoded according to a predetermined entropy coding scheme. Note that the macroblocks have, for example, a size of 16×16 pixels, and is divided into a plurality of blocks that serve as the unit of inter-prediction or intra-prediction. The size of the blocks is, for example, 4×4 pixels, 8×8 pixels or 16×16 pixels.

The mb 331 includes decoding parameters that are common in the entire macroblock (for example, the encoding mode of the macroblock, the quantization parameter, etc.). In addition, when the macroblock is inter-coded, the mb 331 includes the motion parameters of each block in the macroblock. The motion parameters include the reference picture identifier representing the picture to reference, and a motion vector. Furthermore, when a motion vector itself is prediction-coded, the motion parameters include the index pmvIdx representing the method of motion vector prediction, and the error between the motion vector and a predicted motion vector. Meanwhile, when a macroblock is intra-prediction coded, the mb 331 includes an intra-prediction flag, prevIntraPredModeFlag, for determining the intra-prediction mode for each block in the macroblock based on the intra-prediction mode of neighboring blocks. In addition, the mb 331 includes quantization coefficients which are given by performing orthogonal transform and quantization of the prediction error of each pixel in the macroblock.

In addition, when all of the following conditions (a) to (c) are satisfied, the mb 331 may include a motion compensation parameter alpha 332 as one of the motion parameters.

(a) The macroblock corresponding to the mb 331 is inter-coded.

(b) With respect to at least one block in the macroblock corresponding to the mb 331, the block is in the clean region of the picture.

(c) At least part of the reference region in the reference picture which is referenced by the motion parameters of blocks satisfying the conditions (a) and (b) is included in the non-clean region of the reference picture.

With respect to each block satisfying the above conditions (a) to (c), one alpha 332 is defined, when only one of the clean region boundary in the horizontal direction and the clean region boundary in the vertical direction is present in the corresponding reference region. Furthermore, when the clean region boundary in the horizontal direction and the clean region boundary in the vertical direction are both present in the corresponding reference region, two alphas 332 are defined.

As will be illustrated later, the motion compensation parameter alpha 332 represents the tendency of change of pixel values near the clean region boundary. For example, as the pixel values increase significantly from the clean region toward the non-clean region, the alpha 332 assumes positive values and the absolute value also assumes greater values. On the other hand, as the pixel values decrease significantly from the clean region toward the non-clean region, the alpha 332 assumes negative values, and the absolute value also assumes greater values.

The entropy decoding unit 10 is an example of a region boundary position information extraction unit, and extracts, from encoded moving image data, the clean region boundary circulation direction information included in the sequence parameters, and the boundary displacement amount information included in the picture parameters. Then, the entropy decoding unit 10 outputs the circulation direction information and the boundary displacement amount information to the region classification unit 11.

In macroblock data decoded according to a predetermined entropy coding scheme, the entropy decoding unit 10 outputs the quantization coefficients of each macroblock to the inverse-quantizing and orthogonal transform unit 13. In addition, the entropy decoding unit 10 outputs the motion parameters of inter-coded macroblocks among the macroblocks, to the motion compensation unit 16. The entropy decoding unit 10 outputs the intra-prediction flags of intra-prediction coded macroblocks, among the macroblocks, to the intra-prediction unit 17. In addition, the entropy decoding unit 10 outputs the encoding mode of the decoding target macroblock to the selector 15.

The region classification unit 11 specifies the clean region and the non-clean region of the decoding target picture based on the circulation direction information and the boundary displacement amount information received from the entropy decoding unit 10 with respect to the decoding target picture, and the position of the clean region boundary in the previous picture.

In the present embodiment, the boundary displacement amount information includes an eight-bit signal Boundary-Distance. Then, the region classification unit 11 determines the clean region boundary position as follows, based on the value of RefreshDirection included in the circulation direction information, the value of BoundaryDistance, and the position of the clean region boundary in the previous picture. Note that BlockSize is the height and width of a block, which is the application unit of orthogonal transform. With MPEG-2, BlockSize is eight.

When RefreshDirection is "000": The region classification unit 11 determines the clean region boundary position in the decoding target picture at the line that is (BoundaryDistance*BlockSize) pixel lines below the clean region boundary position in the picture that was decoded immediately before. When the decoding target picture is a refresh picture, the clean region boundary position in the picture that was decoded immediately before is the upper end of the picture.

Figure 4A:
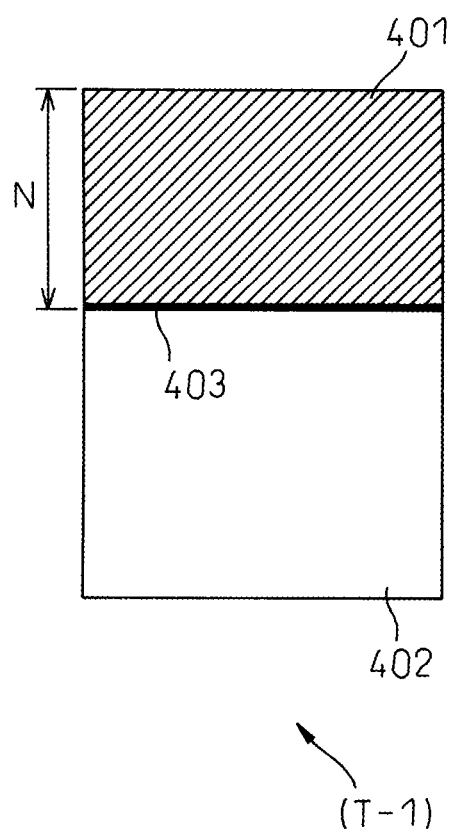
FIG. 4A is a diagram illustrating an example of the clean region boundary in a picture (T−1) when RefreshDirection is "000."
Figure 4B:
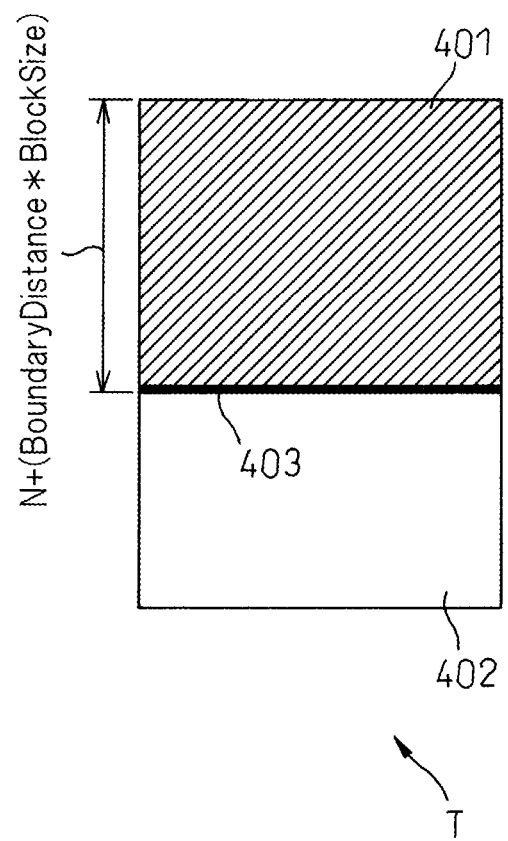
FIG. 4B is a diagram illustrating an example of the clean region boundary in a picture T when RefreshDirection is "000."

FIG. 4A and FIG. 4B are diagrams each illustrating an example of the clean region boundary in a picture (T−1) and a picture T when RefreshDirection is "000." Note that T and (T−1) represent the decoding order of the pictures. In FIG. 4A and FIG. 4B, the region 401 represents the clean region. The region 402 represents the non-clean region. When the clean region boundary 403 in the picture (T−1) is located in the N-th line from the upper end of the picture, the clean region boundary 403 in the picture T is in the (N+BoundaryDistance*BlockSize)-th line from the upper end of the picture.

When RefreshDirection is "001": The region classification unit 11 determines the clean region boundary position in the decoding target picture at the line that is (BoundaryDistance*BlockSize) pixel lines above the clean region boundary position in the picture that was decoded immediately before. When the decoding target picture is a refresh picture, the boundary position in the picture that was decoded immediately before is the lower end of the picture.

Figure 5A:
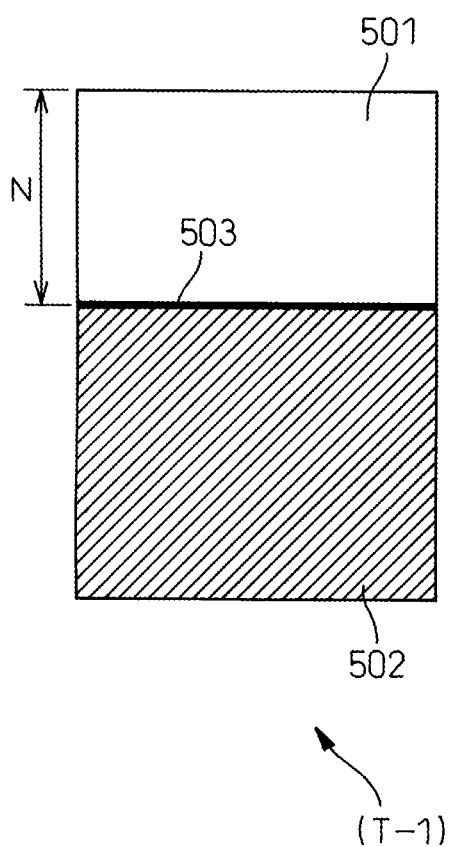
FIG. 5A is a diagram illustrating an example of the clean region boundary in the picture (T−1) when RefreshDirection is "001."
Figure 5B:
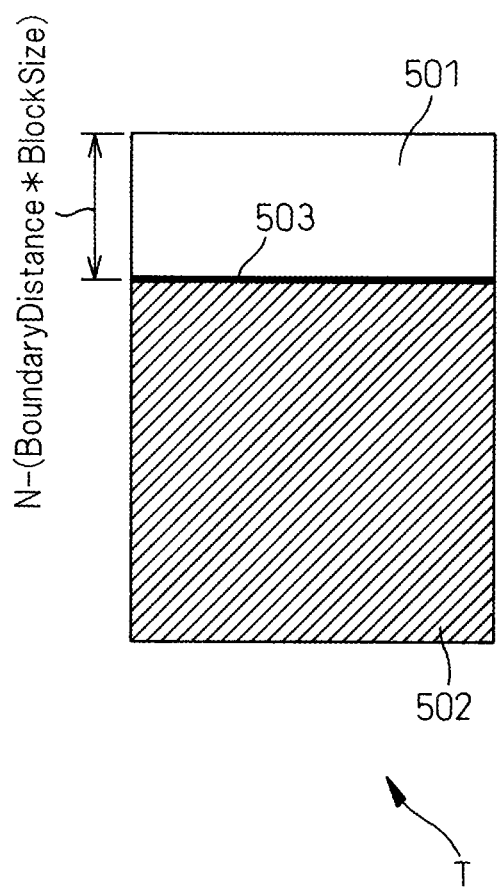
FIG. 5B is a diagram illustrating an example of the clean region boundary in the picture T when RefreshDirection is "001."

FIG. 5A and FIG. 5B are diagrams each illustrating an example of the clean region boundary in the picture (T−1) and the picture T when RefreshDirection is "001." Note that T and (T−1) represent the decoding order of the pictures. In FIG. 5A and FIG. 5B, the region 501 represents the non-clean region. The region 502 represents the clean region. When the clean region boundary 503 in the picture (T−1) is located in the N-th line from the upper end of the picture, the clean region boundary 503 in the picture T is in the (N−BoundaryDistance*BlockSize)-th line from the upper end of the picture.

When RefreshDirection is "010": The region classification unit 11 determines the clean region boundary position in the decoding target picture at the column that is (BoundaryDistance*BlockSize) pixel columns to the left from the clean region boundary position in the picture that was decoded immediately before. When the decoding target picture is a refresh picture, the boundary position in the picture that was decoded immediately before is the left end of the picture.

Figure 6A:
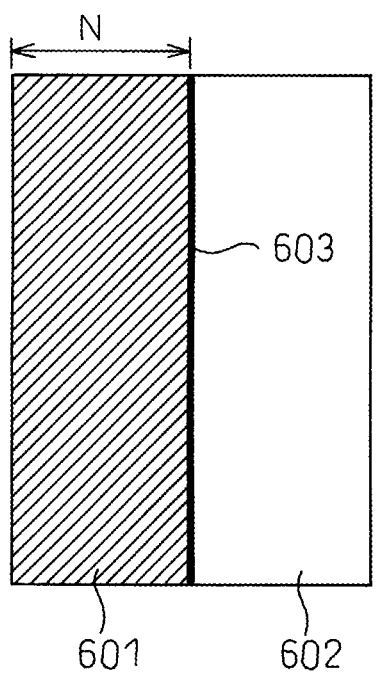
FIG. 6A is a diagram illustrating an example of the clean region boundary in the picture (T−1) when RefreshDirection is "010."
Figure 6B:
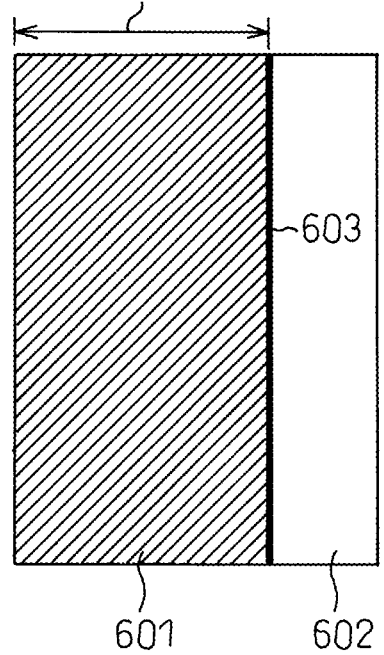
FIG. 6B is a diagram illustrating an example of the clean region boundary in the picture T when RefreshDirection is "010."

FIG. 6A and FIG. 6B are diagrams each illustrating an example of the clean region boundary in the picture (T−1) and the picture T when RefreshDirection is "010." Note that T and (T−1) represent the decoding order of the pictures. In FIG. 6A and FIG. 6B, the region 601 represents the clean region. The region 602 represents the non-clean region. When the clean region boundary 603 in the picture (T−1) is located in the N-th column from the left end of the picture, the clean region boundary 603 in the picture T is in the (N+BoundaryDistance*BlockSize)-th column from the left end of the picture.

When RefreshDirection is "011": The region classification unit 11 determines the clean region boundary position in the decoding target picture at the column that is (BoundaryDistance*BlockSize) pixel columns to the left from the clean region boundary position in the picture that was decoded immediately before. When the decoding target picture is a refresh picture, the boundary position in the picture that was decoded immediately before is the right end of the picture.

Figure 7A:
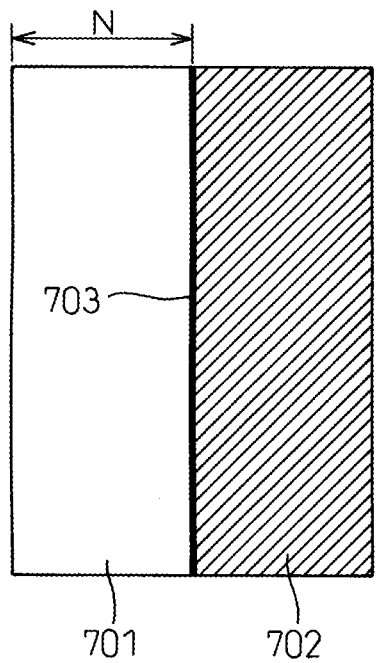
FIG. 7A is a diagram illustrating an example of the clean region boundary in the picture (T−1) when RefreshDirection is "011."
Figure 7B:
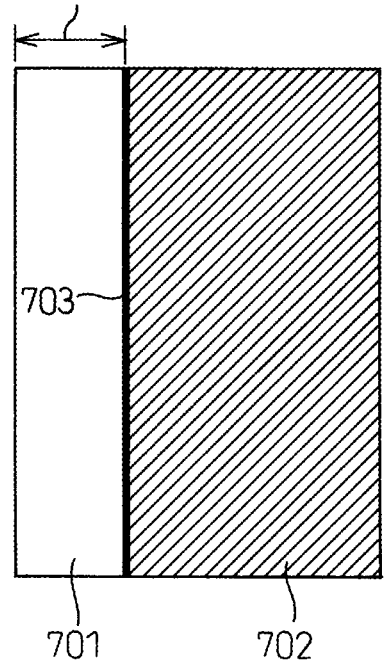
FIG. 7B is a diagram illustrating an example of the clean region boundary in the picture T when RefreshDirection is "011."

FIG. 7A and FIG. 7B are diagrams each illustrating an example of the clean region boundary in the picture (T−1) and the picture T when RefreshDirection is "011." Note that T and (T−1) represent the decoding order of the pictures. In FIG. 7A and FIG. 7B, the region 701 represents the non-clean region. The region 702 represents the clean region. When the clean region boundary 703 in the picture (T−1) is located in the N-th column from the left end of the picture, the clean region boundary 703 in the picture T is in the (N−BoundaryDistance*BlockSize)-th column from the left end of the picture.

When RefreshDirection is "100": The region classification unit 11 determines the clean region boundary position in the decoding target picture at the boundary between the set of macroblocks to the M'=(M+BoundaryDistance)-th macroblock in order of raster scan from the macroblock at the upper left end of the picture, and the set of the rest of the macroblocks. Note that M is the index of the macroblock that was included at the end of the clean region in the picture that was decoded immediately before, i.e., the value of M' in the picture that was decoded immediately before. When the decoding target picture is a refresh picture, M in the picture that was decoded immediately before is 0.

FIG. 8A and FIG. 8B are diagrams each illustrating an example of the clean region boundary in the picture (T−1) and the picture T when RefreshDirection is "100." Note that T and (T−1) represent the decoding order of the pictures. In FIG. 8A and FIG. 8B, the region 801 represents the clean region. The region 802 represents the non-clean region. In the picture (T−1), the clean region boundary 803 is defined by the M-th macroblock MBM from the macroblock MBO of the upper left end of the picture in the order of raster scan. In this case, the clean region boundary 803 in the picture T is defined by the M'(=M+BoundaryDistance)-th macroblock MBM from the macroblock MBO.

The region classification unit 11 stores information representing the range of the clean region and the range of the non-clean region in the decoding target picture, in the image memory 19, with the identifier of the decoding target picture. Furthermore, the region classification unit 11 outputs the information representing the range of the clean region and the range of the non-clean region in the decoding target picture, to the referenceability determining unit 12, with the identifier of the decoding target picture. Note that the information representing the range of the clean region and the range of the non-clean region includes, for example, the value of RefreshDirection, the pixel line or column located in the clean region boundary, or the number of the macroblock that is located immediately before the clean region boundary, in the order of raster scan.

The referenceability determining unit 12 determines whether or not the reference region which the decoding target block in the decoding target macroblock references and the reference region which the decoding target block references are included in the clean region or in the non-clean region. Then, the referenceability determining unit 12 determines whether or not the reference region can be referenced by the decoding target block.

The referenceability determining unit 12 receives, from the motion compensation unit 16, the intra-prediction unit 17 or the post filter unit 18, the position of the decoding target block, the position and range of the reference region which the decoding target block references, and the identifier of the reference picture including the reference region. Note that the reference region is, for example, a region that is specified by a motion vector and used as a predicted image of the decoding target block, when the decoding target macroblock is inter-coded. Furthermore, when the decoding target macroblock is intra-prediction coded, the reference region is a block that neighbors the decoding target block and that is already decoded. The block that is already decoded is located in the decoding target macroblock or in a neighboring macroblock of the decoding target macroblock. Furthermore, when the decoding target block is to be deblocking-filtered, the reference region is the region where calculation is executed using the deblocking filter.

The referenceability determining unit 12 receives, from the region classification unit 11, information representing the range of the clean region and the range of the non-clean region with respect to the decoding target picture. Then, for example, while there is a possibility that the decoding target picture serves as a reference picture with respect to the subsequent pictures, the referenceability determining unit 12 keeps the information in a memory circuit provided inside. Alternatively, the referenceability determining unit 12 may read information representing the range of the clean region and the range of the non-clean region with respect to the reference picture, from the image memory 19.

In order to determine whether the decoding target block is included in the clean region or in the non-clean region, the referenceability determining unit 12 compares the position of the decoding target block and the position of the boundary between the clean region and the non-clean region in the decoding target picture.

When the decoding target block is included in the non-clean region, the referenceability determining unit 12 determines that all of the pixels in the reference region are referenceable, in order to decode the decoding target block. Then, the referenceability determining unit 12 notifies the motion compensation unit 16, the intra-prediction unit 17, or the post filter unit 18 of the determined result.

On the other hand, when the decoding target block is entirely included in the clean region, the decoding target block is decoded using only information that is included in the clean region. Then, by comparing the reference region for the decoding target block with the clean region boundary, the referenceability determining unit 12 specifies the pixels included in the clean region of the reference picture, in the reference region.

When all of the pixels included in the reference region are included in the clean region of the reference picture, the referenceability determining unit 12 notifies the motion compensation unit 16, the intra-prediction unit 17 or the post filter unit 18 of the determined result that all of the pixels included in the reference region are referenceable.

On the other hand, when at least part of the pixels in the reference region is included in the non-clean region of the reference picture, the referenceability determining unit 12 notifies the motion compensation unit 16, the intra-prediction unit 17 or the post filter unit 18 of information representing the referenceable pixels in the reference region and information representing the unreferenceable pixels.

Furthermore, in the cases where the decoding target macroblock is inter-coded and the prediction error vector between the motion vector and a predicted motion vector is included in encoded moving image data, the moving image encoding apparatus to encode the moving image data may use, as the predicted vector, not only a vector in the encoding target picture, but also a vector that originates from the vectors of reference pictures that have been encoded earlier in the past. For example, the Temporal mode of the B-Direct mode defined in H.264, etc., is an example. In this case, the referenceability determining unit 12 determines whether the block which is referenced to determine the predicted motion vector as one of the reference region, is included in the clean region or in the non-clean region in the decoding target picture and the reference picture.

For this purpose, the referenceability determining unit 12 receives, from the motion compensation unit 16, the position and range of the reference region which includes the position of the decoding target block and all of the blocks that have a possibility of being referenced to determine predicted motion vectors. Then, when the decoding target block is included in the clean region, with respect to each block in the reference region, the referenceability determining unit 12 determines that the block in the reference region is referenceable when the block in the reference region is included in the clean region, and determines that the other blocks are unreferenceable. Furthermore, when the decoding target block is included in the non-clean region, the referenceability determining unit 12 determines that all of the blocks in the reference region are referenceable. For each block in the reference region, the referenceability determining unit 12 notifies the motion compensation unit 16 of the determined result as to whether or not the block is referenceable.

Based on the information received from the entropy decoding unit 10, the decoding unit 20 reconstructs the moving image data. At this time, the decoding unit 20 reconstructs the decoding target block, based on the pixels which the decoding target block can reference. For this purpose, the units included in the decoding unit 20 operate as illustrated below.

The inverse-quantizing and orthogonal transform unit 13 performs inverse-quantization by multiplying the quantization coefficients of the blocks in the decoding target macroblock, received from the entropy decoding unit 10, by a predetermined number corresponding to the quantization step size determined by the quantization parameters. By the inverse-quantization, the set of the orthogonal transform coefficients of the blocks in the decoding target macroblock is reconstructed. Then, the inverse-quantizing and orthogonal transform unit 13 performs an inverse orthogonal transform process for the set of the orthogonal transform coefficients to reconstruct the prediction error of each pixel included in the decoding target macroblock. Note that the inverse orthogonal transform process is an inverse transform of the orthogonal transform process performed with respect to the blocks included in the macroblock when moving image data was encoded, and is, for example, the inverse Discrete Cosine Transform (DCT). The inverse-quantizing and orthogonal transform unit 13 outputs the prediction error of each pixel included in the decoding target macroblock, to the adder 14.

The adder 14 adds, to the prediction error of each pixel in the decoding target macroblock received from the inverse-quantizing and orthogonal transform unit 13, the value of a corresponding pixel in a predicted image received from the selector 15, and thereby reconstructs the values of the pixels of the decoding target macroblock before the post-filter is applied. Then, the adder 14 stores the reconstructed pixel values of the decoding target macroblock in the image memory 19.

According to the encoding mode of the decoding target macroblock, the selector 15 receives a predicted image from the motion compensation unit 16 or from the intra-prediction unit 17. For example, when the encoding mode indicates that the decoding target macroblock is inter-coded, the selector 15 receives a motion-compensated predicted image from the motion compensation unit 16, and outputs the predicted image to the adder 14. On the other hand, when the encoding mode indicates that the decoding target macroblock is intra-prediction coded, the selector 15 receives an intra-predicted image from the intra-prediction unit 17, and outputs the predicted image to the adder 14.

The motion compensation unit 16 generates a motion-compensated predicted image with respect to the decoding target macroblock. For this purpose, based on the position of the decoding target macroblock and the motion parameters received from the entropy decoding unit 10, the motion compensation unit 16 specifies the position of the reference region which the decoding target block in the decoding target macroblock references, and the reference picture including the reference region.

For example, the motion compensation unit 16 specifies the reference picture based on the reference picture identifier. The motion compensation unit 16 specifies the reference region by adding a motion vector to the position of the decoding target block. For example, the reference region is determined as follows.

The upper left position of the decoding target block, the block size, and the integer part of the motion vector are (x, y), (BlockSize, BlockSize), and (vx, vy), respectively. In this case, the reference region is the region surrounded by the four points (x+vx, y+vy), (x+vx+BlockSize+ExtSizeH−1, y+vy), (x+vx, y+vy+BlockSize+ExtSizeV−1) and (x+vx+BlockSize+ExtSizeH−1, y+vy+BlockSize+ExtSizeV−1). In other words, the reference region is a rectangular region where the position of the upper left corner is (x+vx, y+vy) and the size in the horizontal direction and the vertical direction is (BlockSize+ExtSizeH−1, BlockSize+ExtSizeV−1). Note that ExtSizeH and ExtSizeV are the number of taps of the interpolation filter that is applied when calculating the pixel values of the non-integer positions, when the horizontal component and the vertical component of the motion vector include decimal components. In MPEG-4 AVC/H.264, ExtSizeH and ExtSizeV are both six.

The motion compensation unit 16 notifies the referenceability determining unit 12 of information to include the position of the decoding target block, the position and range of the reference region, and the identifier of the reference picture.

In addition, the motion compensation unit 16 receives the determined result as to whether or not each pixel included in the reference region is referenceable, from the referenceability determining unit 12. Then, when all of the pixels included in the reference region are referenceable, based on the reference region, the motion compensation unit 16 generates a predicted image according to, for example, the method defined in the MPEG-4 AVC/H.264 standard.

On the other hand, when part of the pixels included in the reference region is not referenceable, the motion compensation unit 16 generates a predicted image without using the values of the unreferenceable pixels. For this purpose, the motion compensation unit 16 replaces the values of the unreferenceable pixels by values calculated based on the referenceable pixels.

Figure 9:
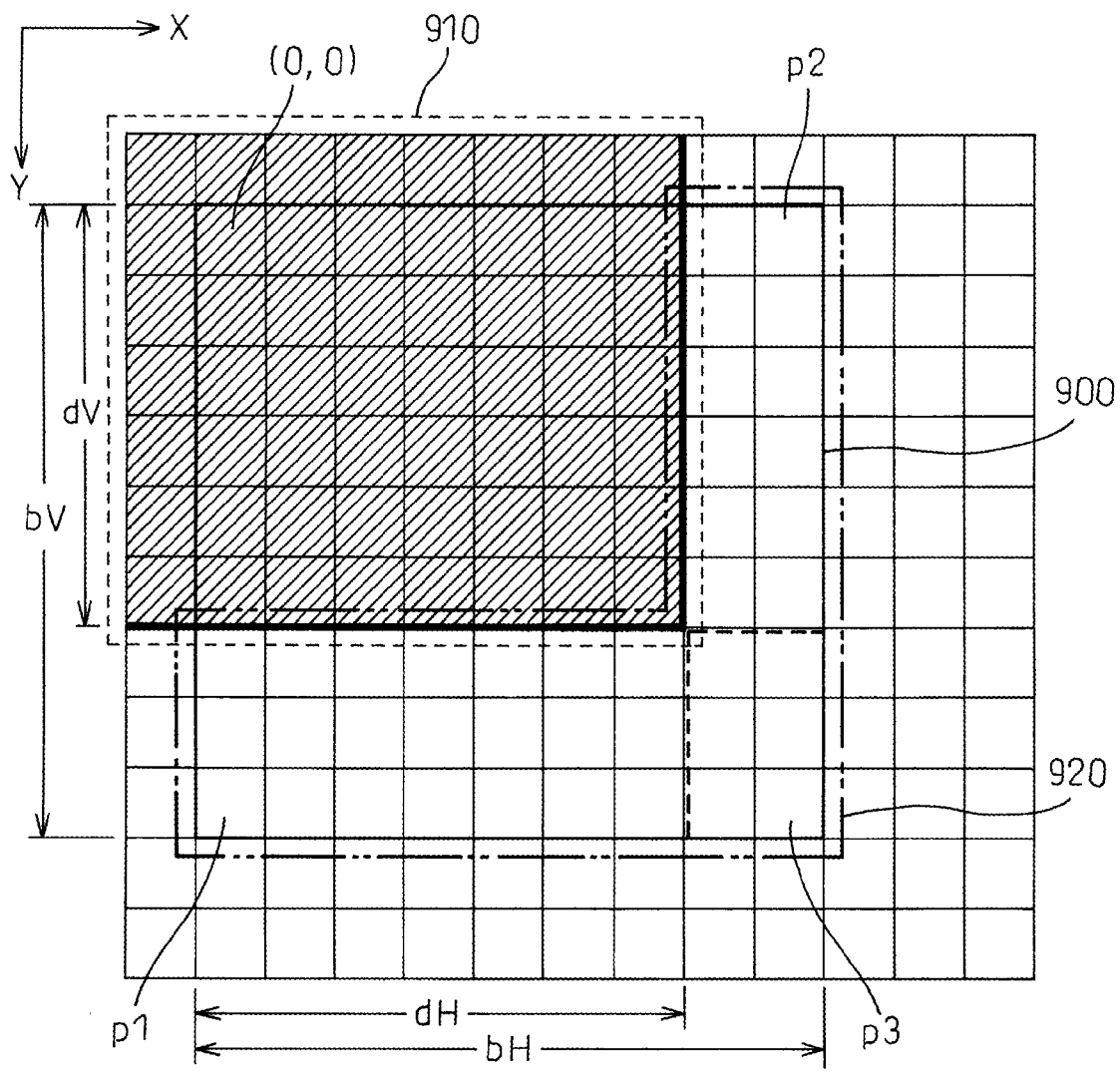
FIG. 9 is a diagram illustrating an example of the position relationship between a reference region for motion compensation, and the clean region and the non-clean region in a reference picture.

FIG. 9 is a diagram illustrating an example of the position relationship between a reference region, and the clean region and the non-clean region in a reference picture. In FIG. 9, the region 900 is the reference region, and has a width bH in the horizontal direction and a height bV in the vertical direction.

The region 910 is the clean region. Then, the region 920 (i.e., two columns at the right end and three rows at the lower end) in the reference region 900 is located in the non-clean region. The decoding target block is located in the clean region.

In the present embodiment, the region 920, which is not included in the clean region 910 in the reference region 900, is divided into a region p1, which neighbors the clean region 910 in the vertical direction, a region p2, which neighbors the clean region 910 in the horizontal direction, and the other region p3.

The motion compensation unit 16 calculates the values of predicted pixels of the horizontal direction coordinate x and the vertical direction coordinate y included in the regions p1 to p3, for each of the regions p1 to p3, by, for example, performing extrapolation calculation, according to the following equations.

$$p1(x,y)=p(x,dV-1)\{1+(\text{alpha}Y^*(y-dV+1)/(bV-dV))\}$$
$$(0 \le x \le dH), (dV \le y < bV)$$

$$p2(x,y)=p(dH-1,y)\{1+(\text{alpha}X^*(x-dH+1)/(bH-dH))\}$$
$$(dH \le x < bH), (0 \le y < dV)$$

$$p3(x,y)=(p1(dH-1,y)+p2(x,dV-1))/2 (dH \le x < bH),$$
$$(dV \le y < bV) \quad (1)$$

Note that the coordinates (x, y) are the coordinate values when the coordinates of the pixel of the upper left end in the reference region 900 are (0, 0). dH and dV are the numbers of pixels in the horizontal direction and in the vertical direction in the region overlapping the clean region 910 in the reference region 900. Furthermore, the coefficients alphaX and alphaY are motion compensation parameters included in the macroblock data. The coefficient alphaX represents the degree of variation of pixel values in the horizontal direction from the clean region to the non-clean region in the reference region 900. The coefficient alphaY represents the degree of variation of pixel values in the vertical direction from the clean region to the non-clean region in the reference region 900. In other words, equations (1) make the value of the pixels in the region p1 and the region p2 be the value given by multiplying the value of a referenceable pixel that neighbors the region p1 or p2, by a correction coefficient, which represents the ratio of the degrees of change of pixel values in the horizontal direction or the vertical direction, the alphaX and the alphaY, to the distance from the referenceable pixel.

The moving image encoding apparatus knows the correct value of each pixel in the reference region before encoding, and therefore is able to calculate an optimal motion compensation parameter. Consequently, even when pixel values change in a gradation in the reference region, the motion compensation unit 16 is able to make the values of the predicted pixels in the regions p1 to p3 be values close to the actual pixel values, by performing extrapolation calculation using the motion compensation parameter.

Note that the motion compensation unit 16 may replace the values of pixels in the region p1 by the pixel values in the clean region neighboring the region p1. Likewise, the motion compensation unit 16 may replace the values of pixels in the region p2 by the pixel values in the clean region neighboring the region p2.

Note that, when bV≤dV, i.e., when at least one pixel is included in the clean region with respect to each line from the upper end to the lower end of the reference region, the motion compensation unit 16 calculates the values of all of the predicted pixels not included in the clean region according to the equation corresponding to the p2 region.

When bH≤dH, i.e., when at least one pixel is included in the clean region with respect to each column from the left end to the right end of the reference region, the motion compensation unit 16 calculates the values of all of the predicted pixels not included in the clean region according to the equation corresponding to the p1 region.

When the clean region moves from the right to the left, the region p2 neighbors the left side of the clean region. In this case, the motion compensation unit 16 calculates the values of the predicted pixels included in the region p2 using the equations in which (dH−1) in equations (1) is replaced by (bH−dH) and (x−dH+1) is replaced by (bH−dH−x).

Likewise, when the clean region moves from bottom to top, the region p1 neighbors the upper side of the clean region. In this case, the motion compensation unit 16 calculates the values of the predicted pixels included in the region p1 using the equations in which (dV−1) in equations (1) is replaced by (bV−dV) and (y−dV+1) is replaced by (bV−dV−y).

When the referenceability determining unit determines that all of the pixels of the reference region are unreferenceable, the motion compensation unit 16 applies a predetermined value to the values of all pixels. Furthermore, the motion compensation unit 16 may set the value of each pixel to the value given by correcting the predetermined value by the motion compensation parameter alpha.

When all of the reference blocks are referenceable, the index pmvIdx has, for example, the values from "0" to "9," represented by four bits. Then, depending on the value of the index pmvIdx, the predicted motion vector PMV is defined as follows.

pmvIdx=0: PMV=VbA
pmvIdx=1: PMV=VbB
pmvIdx=2: PMV=VbC
pmvIdx=3: PMV=VbD
pmvIdx=4: PMV=median(VbA, VbB, VbC)
pmvIdx=5: PMV=VspaEXT
pmvIdx=6: PMV=Vcol
pmvIdx=7: PMV=median(Vcol, Vt0, Vt1, Vt2, Vt3)
pmvIdx=8: PMV=median(Vcol, Vt0, Vt1, Vt2, Vt3, Vt4, Vt5, Vt6, Vt7)
pmvIdx=9: PMV=median(Vcol, Vcol, VbA, VbB, VbC)

The function median(Vj)(Vj∈{VbA, VbB, VbC, Vcol, Vti}) is a function which separately outputs the median of the horizontal components and the median of the vertical components of the motion vector Vj, which is a parameter of the function. For example, when VbA=(2, 4), VbB=(4, 2) and VbC=(6, 10), the median (VbA, VbB, VbC)=(4, 4). When any of the parameters of the function median (Vj) is undefined, the output value of the function median (Vj) is not defined either.

Furthermore, VspaEXT is defined as follows.

$$VspaEXT = \text{median}(VbA, VbB, VbC) \text{ (when } bA, bB \text{ and } bC \text{ are valid)}$$
$$= VbA \text{ (when } bA \text{ is valid, and at least one of } bB \text{ and } bC \text{ is not valid)}$$
$$= VbB \text{ (when } bB \text{ is valid, and } bA \text{ is not valid)}$$
$$= VbC \text{ (when none of the above conditions is satisfied)}$$

Furthermore, a motion vector may be encoded by the prediction error between the motion vector and a predicted motion vector. In this case, the motion compensation unit 16 notifies the referenceability determining unit 12 of information representing the position and range of the reference region including all of the blocks that have a possibility of being referenced to determine the predicted motion vector with the position of the decoding target block. Then, the motion compensation unit 16 receives a determined result representing the referenceable blocks, from the referenceability determining unit 12. The motion compensation unit 16 determines the predicted motion vector based on the determined result and the index pmvIdx.

Figure 10A:
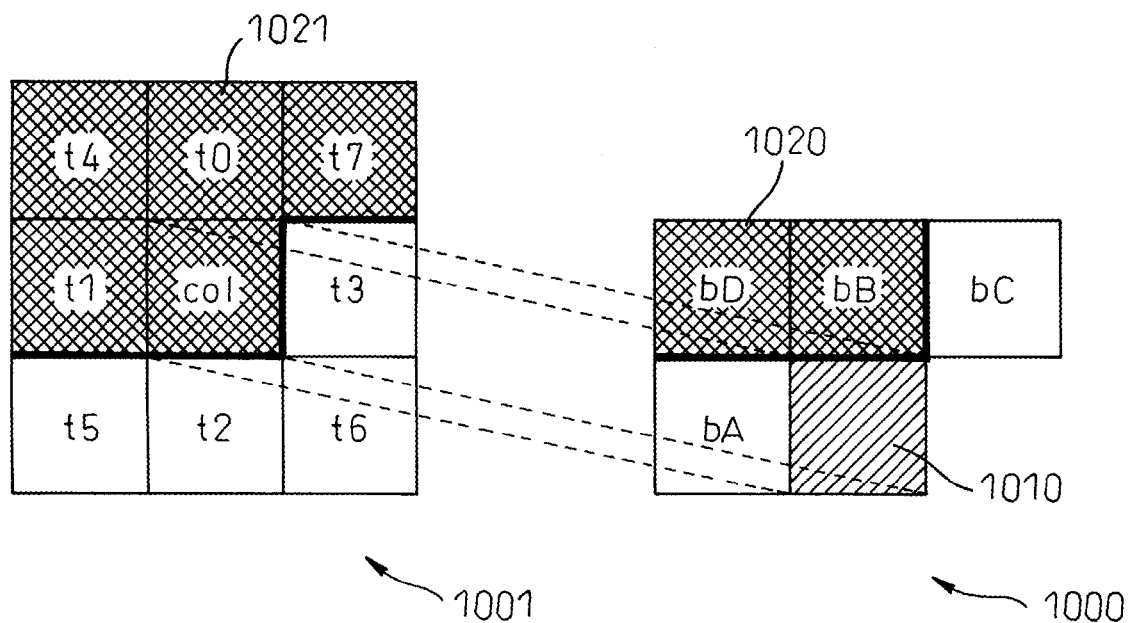
FIG. 10A is a diagram illustrating an example of the position relationship between a decoding target block and blocks that are referenced to generate a predicted motion vector for the decoding target block.
Figure 10B:
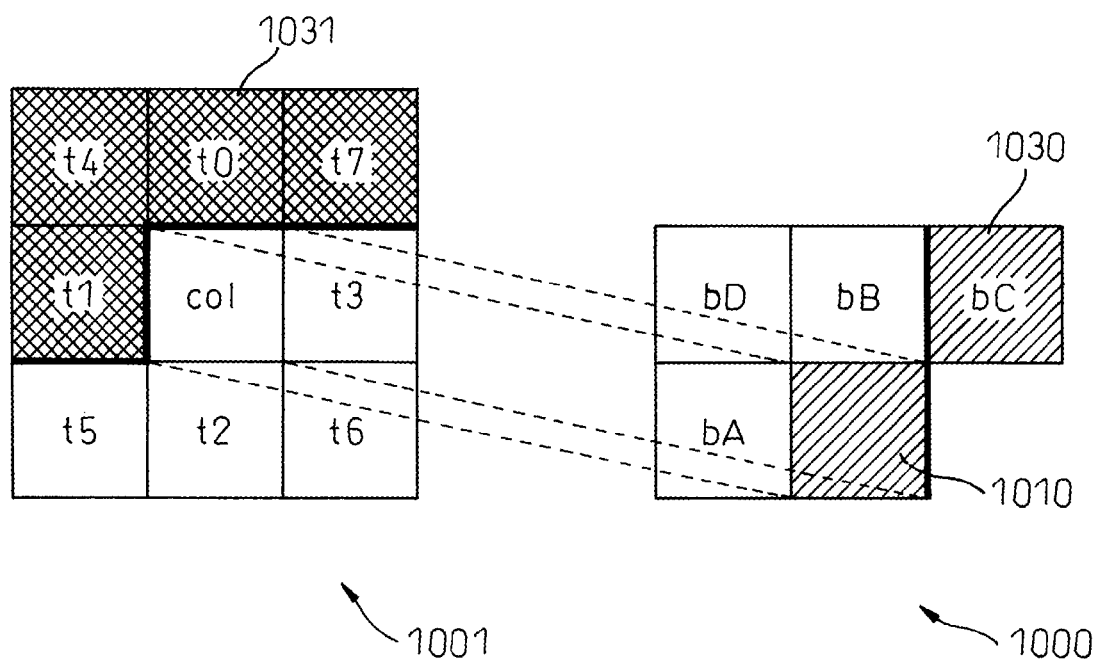
FIG. 10B is a diagram illustrating an example of the position relationship between a decoding target block and blocks that are referenced to generate a predicted motion vector for the decoding target block.

FIG. 10A and FIG. 10B are diagrams each illustrating an example of the position relationship between the decoding target block and blocks that are referenced to generate a predicted motion vector for the decoding target block. In FIG. 10A and FIG. 10B, the block 1010 included in the decoding target picture 1000 at time T is the decoding target block. Then, the upper left, upper, upper right, and left neighboring blocks bD, bB, bC and bA, of the decoding target block 1000, are the reference blocks. The motion vectors of the reference blocks bD, bB, bC and bA are represented by VbD, VbB, VbC and VbA, respectively. Furthermore, in the picture 1001 at time (T−1), the block col that is located in the same position as the decoding target block 1000, and the surrounding blocks t0 to t7, also serve as reference blocks. The motion vectors of the reference blocks col and ti (i=0, 1, . . . , 7) are represented by Vcol and Vti, respectively.

Note that, when a reference block is referenceable, is located in the reference picture and furthermore is inter-coded, the reference block is valid. Otherwise, the reference block is not valid.

When a reference block j is not valid, the motion vector Vj of the reference block j is defined as follows.
The reference block that is not valid is bA: VbA=(0, 0)
The reference block that is not valid is bB: VbB=VbA
The reference block that is not valid is bC: VbC=VbA
The reference block that is not valid is bD: VbD=VbA
The reference block that is not valid is col: Vcol is undefined
The reference block that is not valid is ti (i=0, 1, . . . , 7): Vti=Vcol The value of the index pmvIdx corresponding to undefined motion vector is also undefined. Furthermore, when there are a plurality of values for the index pmvIdx that give the same predicted motion vector, the values of the index pmvIdx may be re-assigned such that the values are other than the minimum value are excluded. In this case, the number of bits to be assigned to the index pmvIdx in the macroblock data is set to the minimum value that can represent the valid value range for the index pmvIdx. For example, when the index pmvIdx assumes the values from "0" to "5," (i.e., Vcol is "undefined"), the index pmvIdx is entropy-coded in three bits. Furthermore, when all the reference blocks are referenceable, and, as a result, pmvIdx assumes values from "0" to "9," the index pmvIdx is entropy-coded in four bits.

For example, assume that, in FIG. 10A, the region 1020 in the picture 1000 and the region 1021 in the picture 1001 are the non-clean regions. In this case, the blocks bB, bD, col, t0, t1, t4 and t7 are unable to be referenced. Consequently, the motion vector Vcol is undefined, and therefore the index pmvIdx which reference the motion vector Vcol is also undefined, and the index pmvIdx does not assume the values "6" to "9." Furthermore, the motion vectors VbB and VbD are both equal to VbA, and therefore the motion vector when the index pmvIdx assumes the values "1," "3" and "4" is the same as the predicted motion vector VbA when the index pmvIdx is "0." Consequently, the index pmvIdx is the value of one of the value "0," representing that the predicted motion vector is VbA, and the value "2," representing that the predicted motion vector is VbC. Then, the values of the index pmvIdx are re-assigned such that the two patterns of predicted motion vectors can be designated. As a result, the relationship between the index pmvIdx and the predicted motion vector PMV is as follows:

pmvIdx=0: PMV=VbA
pmvIdx=1: PMV=VbC

Furthermore, assume that, in FIG. 10B, the region 1030 in the picture 1000 and the region 1031 in the picture 1001 are the non-clean regions. In this case, the blocks bC, t0, t1, t4 and t7 are unable to be referenced. Since the block bC is not valid, the output value of median(VbA, VbB, VbC) and the output value of VSpaEXT are both VbA. Consequently, the predicted motion vector when the index pmvIdx is "4" or "5" is equal to the predicted motion vector when the index pmvIdx is "0." Consequently, "4" and "5" are excluded with respect to the index pmvIdx, and the values of the index pmvIdx are re-assigned as follows.

pmvIdx=0: PMV=VbA
pmvIdx=1: PMV=VbB
pmvIdx=2: PMV=VbD
pmvIdx=3: PMV=Vcol
pmvIdx=4: PMV=median(Vcol, Vcol, Vcol, Vt2, Vt3)
pmvIdx=5: PMV=median(Vcol, Vcol, Vcol, Vt2, Vt3, Vcol, Vt5, Vt6, Vtcol)
pmvIdx=6: PMV=median(Vcol, Vcol, VbA, VbB)

As a result, the entropy coding bit width for the index pmvIdx is three.

The motion compensation unit 16 determines the predicted motion vector corresponding to the value of the index pmvIdx, according to the above rules. Then, the motion compensation unit 16 calculates a motion vector by adding the prediction error of the motion vector to the predicted motion vector. The motion compensation unit 16 generates a predicted image using the calculated motion vector as described above.

Note that, when a plurality of blocks are included in one macroblock and motion vectors are calculated on a per block basis, the motion compensation unit 16 performs the same processes as described above for each block and generate a predicted image. The motion compensation unit 16 outputs the motion-compensated predicted image to the selector 15.

When the decoding target macroblock is intra-prediction coded, the intra-prediction unit 17 generates a predicted image according to the intra-prediction coding mode intraPredMode, attached to each block data.

Then, the intra-prediction unit 17 sets the region including the blocks that neighbor the upper side and left side of the decoding target block and that are already decoded, as the reference region, and notifies the referenceability determining unit 12 of the position and range of the reference region with the position of the decoding target block. Then, the intra-prediction unit 17 receives the determined result as to whether or not each pixel in the reference region is referenceable, from the referenceability determining unit 12.

Figure 11:
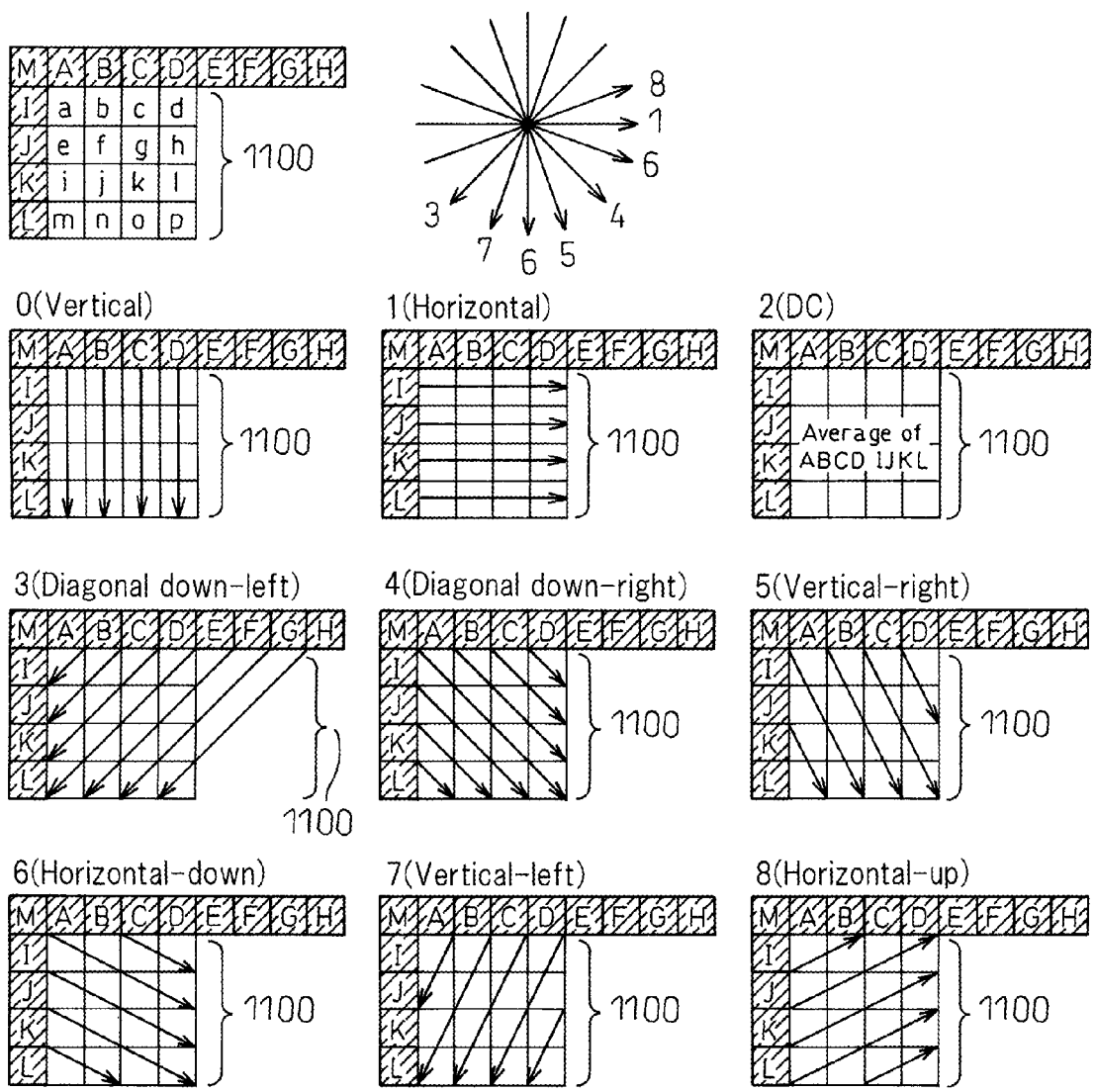
FIG. 11 is a diagram illustrating the relationship between the intra-prediction mode and the prediction direction.

FIG. 11 is a diagram illustrating the relationship between the intra-prediction mode when the block size is 4×4 pixels, and the prediction direction. In FIG. 11, the block 1100 including the pixels a to p is the decoding target picture, and the pixels A to L are included in the reference region. The arrows represent the prediction direction, and the numerical values 0, 1, and 3 to 8, associated with the arrows, each represent the intra-prediction mode that corresponds to the arrow. In addition, when the prediction mode is "2," a predicted image is generated in a DC mode. In the present example, each pixel value of the predicted image generated in the DC mode is an average value of the pixel values of the pixels A to L.

The intra-prediction unit 17 decodes the intra-prediction coding mode intraPredMode of the decoding target block. In the present embodiment, as illustrated in FIG. 11, the intra-prediction coding mode intraPredMode has the value of one of 0 to 8. For this purpose, the intra-prediction unit 17 reads the intra-prediction coding mode intraPredModeA of the left neighboring block of the decoding target block, from the memory included in the intra-prediction unit 17. Furthermore, the intra-prediction unit 17 reads the intra-prediction coding mode intraPredModeB of the upper neighboring block of the decoding target block, from the memory included in the intra-prediction unit 17.

When the left neighboring block is determined by the referenceability determining unit to be unreferenceable, is located outside the picture, is not decoded yet, or is inter-coded, intraPredModeA is set to a value representing the DC mode (for example, "2"). Likewise, when the upper neighboring block is determined by the referenceability determining unit to be unreferenceable, is located outside the picture, is not decoded yet, or is inter-coded, intraPredModeB is set to a value representing the DC mode.

Furthermore, the intra-prediction unit 17 references the one-bit flag prevIntraPredModeFlag, in the block data. When the value of prevIntraPredModeFlag is "1," the intra-prediction unit 17 sets the value predIntraPredMode (=min (intraPredModeA, intraPredModeB)), as the intra-prediction coding mode intraPredMode for the decoding target block. Note that the function min(x, y) is a function to output the one having the smaller value between the variables x and y.

On the other hand, when the value of prevIntraPredModeFlag is "0," the intra-prediction unit 17 references the three-bit data remIntraPredMode, which is included in the block data and which represents the error with respect to the predicted value of the intra-prediction mode. Then, the intra-prediction unit 17 determines the intra-prediction coding mode intraPredMode for the decoding target block as follows.

When the value of remIntraPredMode is smaller than the value of predIntraPredMode, the intra-prediction unit 17 sets the intra-prediction coding mode intraPredMode to the mode represented by the value of remIntraPredMode. On the other hand, when the value of remIntraPredMode is greater than the value of predIntraPredMode, the intra-prediction unit 17 sets the intra-prediction coding mode intraPredMode to the mode represented by the value of (remIntraPredMode+1).

Based on the intra-prediction coding mode intraPredMode and the determined result as to whether or not each pixel in the reference region is referenceable, the intra-prediction unit 17 determines whether or not the pixels to be used to generate a predicted image are referenceable.

When the pixels to be used to generate a predicted image are referenceable, the intra-prediction unit 17 generates the predicted image. At this time, the intra-prediction unit 17 generates the predicted image according to, for example, the method defined in the MPEG-4 AVC/H.264 standard. Meanwhile, when any of the pixels to be used to generate a predicted image is unreferenceable or is located outside the picture, the intra-prediction unit 17 determines that the decoding has failed. In this case, the intra-prediction unit 17 does not generate the predicted image.

To be more specific, the intra-prediction unit 17 determines whether or not the decoding has failed, with respect to the intra-prediction coding mode. Note that an "invalid" block is one of a block that is determined by the referenceability determining unit to be unreferenceable, a block that is located outside the picture, or a block that has not been decoded yet.

intraPredMode=0: When the upper neighboring block of the decoding target block is "invalid," the intra-prediction unit 17 determines that the decoding has failed.

intraPredMode=1: When the left neighboring block of the decoding target block is "invalid," the intra-prediction unit 17 determines that the decoding has failed.

intraPredMode=2: The intra-prediction unit 17 always determines that the decoding has been successful. Note that, when the upper or left neighboring block of the decoding target block is "invalid," the value of each pixel in the predicted image is set to "128."

intraPredMode=3: When the upper neighboring block of the decoding target block is "invalid," the intra-prediction unit 17 determines that the decoding has failed.

intraPredMode=4: When at least one of the upper and left neighboring blocks of the decoding target block is "invalid," the intra-prediction unit 17 determines that the decoding has failed.

intraPredMode=5: When at least one of the upper and left neighboring blocks of the decoding target block is "invalid," the intra-prediction unit 17 determines that the decoding has failed.

intraPredMode=6: When at least one of the upper and left neighboring blocks of the decoding target block is "invalid," the intra-prediction unit 17 determines that the decoding has failed.

intraPredMode=7: When the upper neighboring block of the decoding target block is "invalid," the intra-prediction unit 17 determines that the decoding has failed.

intraPredMode=8: When the left neighboring block of the decoding target block is "invalid," the intra-prediction unit 17 determines that the decoding has failed.

Note that, when the intra-prediction unit 17 references the pixels of the upper right block in intra-prediction such as when intraPredMode is 3 or 7, the pixel values of the upper right neighboring block of the decoding target block—to be more specific, the values of pixels E, F, G, and H in FIG. 11—are referenced. When the upper neighboring block of the decoding target block is not "invalid" and the upper right neighboring block of the decoding target block is "invalid," an intra-predicted image may be generated by making the values of the pixels E, F, G and H the same value as the pixel D.

When generating a predicted image with respect to the decoding target block, the intra-prediction unit 17 outputs the predicted image to the selector 15. Furthermore, the intra-prediction unit 17 stores the intra-prediction coding mode of the decoding target block, with an identifier to identify the decoding target block, in the memory included in the intra-prediction unit 17, so that the intra-prediction coding mode of the decoding target block is referenceable in blocks to be decoded later.

The post filter unit 18 executes a filtering process using a deblocking filter, as a post filter process, for each pixel of the block before the post filter process is applied, output from the adder 14. Then, the post filter unit 18 removes the block distortion that is produced in the boundaries between neighboring blocks. Note that the block distortion is the distortion which the user recognizes in the block shape, due to the fact that the direct current components become discontinuous between neighboring blocks.

The post filter unit 18 notifies the referenceability determining unit 12 of the position of the target block and the position and range of the reference region, which the deblocking filter references with respect to the attention pixel in the target block.

When the post filter unit 18 receives the determined result that all of the pixels in the reference region are referenceable from the referenceability determining unit 12, the post filter unit 18 executes the deblocking filter process using all of the pixel values included in the reference region. For example, when the target block is included in the non-clean region, or when both of the target block and the region referenced by the deblocking filter are included in the clean region, all of the pixels in the reference region are referenceable. Note that the deblocking filter may be made the deblocking filter defined in the MPEG-4 AVC/H.264 standard.

On the other hand, when the post filter unit 18 receives the determined result that, among the pixels included in the reference region, the pixels included in surrounding blocks to neighbor the target block are unreferenceable, the post filter 18 executes a display filter process and a decoding filter process for the attention pixel.

The display filter process is filter process using the deblocking filter defined in the MPEG-4 AVC/H.264 standard. In the display filter process, the post filter unit 18 performs the deblocking filter process using also the values of the pixels that are determined to be unreferenceable. Then, the data of the target block, to which the display filter process has been applied, is used for display use. By this means, the moving image decoding apparatus 1 is able to display the decoded picture, from which the block distortion is removed better by applying the deblocking filter to the blocks located near the clean region boundaries in an ideal manner.

On the other hand, in the decoding filter process, the post filter unit 18 executes the filter process without referencing the values of the pixels that are determined to be unreferenceable, among the pixels which the deblocking filter references. For example, the post filter unit 18 replaces the values of the pixels that are determined to be unreferenceable, by the values of the pixels in the target block. Then, the post filter unit 18 performs the deblocking filter process using the pixel values after the replacement. Then, the data of the target block, to which the decoding filter process has been applied, is used in order to decode other blocks included in pictures after the present decoded picture in the order of decoding.

Figure 12:
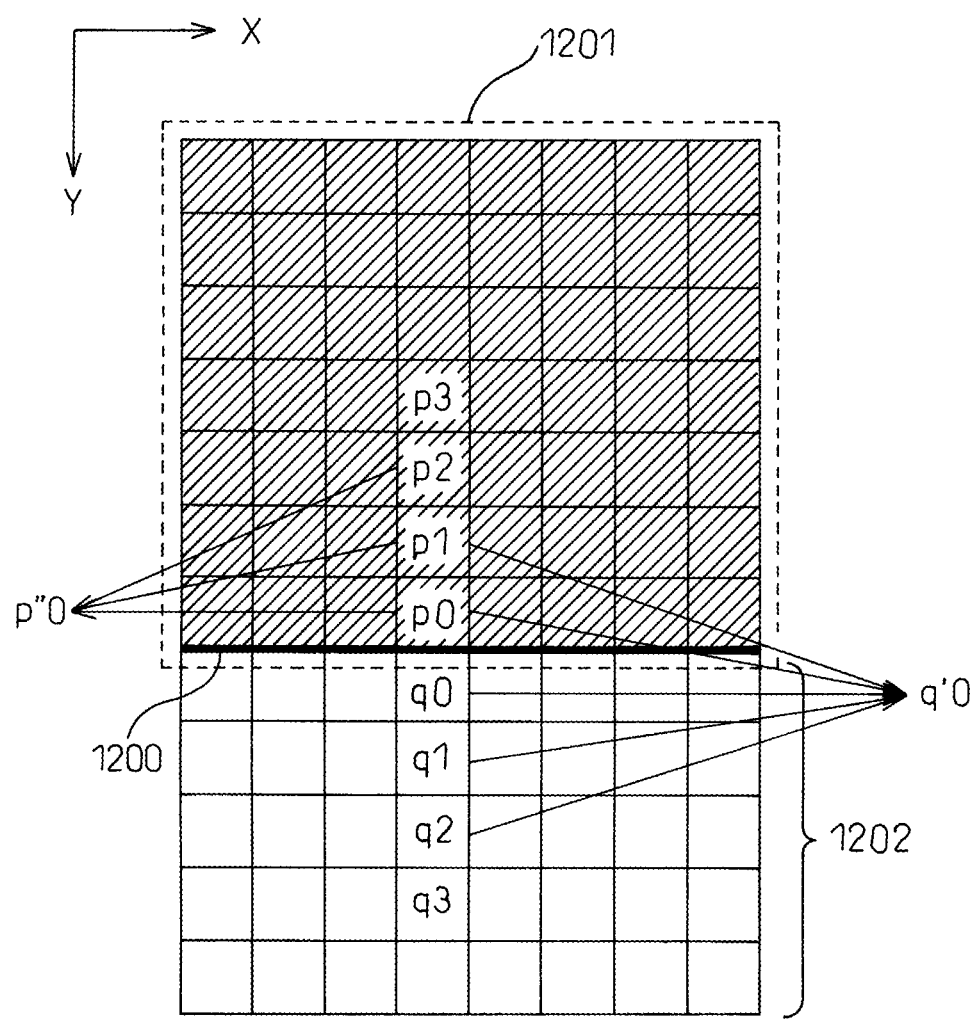
FIG. 12 is a diagram illustrating an example of the relationship between pixels which a deblocking filter references, and the clean region and the non-clean region.

FIG. 12 is a diagram illustrating an example of the relationship between pixels which the deblocking filter references, and the clean region and the non-clean region. In FIG. 12, the region 1201 above the boundary 1200 is the clean region, and the region 1202 below the boundary 1200 is the non-clean region. Furthermore, the pixels p0 to p3 and q0 to q3 are the pixels that are referenced by the deblocking filter. For the pixels p0 to p3, the pixels q0 to q1 are unreferenceable, and, for the pixels q0 to q3, the pixels p0 to p1 are referenceable.

In this case, as the display filter process for the attention pixels p0 to p2, for example, the post filter unit 18 executes the filter process in accordance with the same equations, in the same way as with the strongest filter defined in the MPEG-4 AVC/H.264 standard.

$$p'0=(p2+2*p1+2*p0+2*q0+q1+4)>>3$$

$$p'1=(p2+p1+p0+q0+2)>>2$$

$$p'2=(2*p3+3*p2+p1+p0+q0+4)>>3 \quad (2)$$

Note that, in equations (2), p0 to p3, q0 and q1 represent the values of the pixels p0 to p3, q0 and q1, illustrated in FIG. 12. Furthermore, p'0 to p'2 are the values of the pixels p0 to p2 after the display filter process is applied. The operator ">>" is a bit shift operator, and, with respect to the equation (x>>y), bit-shifts the variable x over y bits in the right direction. Note that, even when all of the pixels p0 to p3, q0, and q1 are referenceable, the post filter unit 18 may execute the deblocking filter process in accordance with equations (2).

Furthermore, the post filter unit 18 executes the filter process, as the decoding filter process for the attention pixels p0 to p2 in accordance with the following equations.

$$p''0=(p2+2*p1+5*p0+4)>>3$$

$$p''1=(p2+p1+2*p0+2)>>2$$

$$p''2=(2*p3+3*p2+p1+2*p0+4)>>3 \quad (3)$$

Note that, in equations (3), p0 to p3, q0 and q1 represent the values of the pixels p0 to p3, q0, and q1, illustrated in FIG. 11. Furthermore, p"0 to p"2 are the values of the pixels p0 to p2 after decoding filter process is applied. As illustrated in equations (3), in the decoding filter process, the values of the pixels q0 and q1 included in the non-clean region are replaced by the value of the pixel p0 neighboring the non-clean region. Note that the post filter unit 18 may replace the values of the pixels q0 and q1, included in the non-clean region, by the values of the pixels p0 and p1 included in the clean region. Meanwhile, for the decoding filter process for the attention pixels q0 to q2, the post filter unit 18 performs the filter process using the equations in which p and q in equations (2) are switched. Unlike the attention pixels p0 to p2, the post filter unit 18 does not have to replace the pixel values of p0 and p1.

The post filter unit 18 stores the pixel values of the target macroblock to which the display filter process has been applied, and the pixel values of the target macroblock to which the decoding filter process has been applied, in the image memory 19.

The image memory 19 is, for example, a semi-conductor memory, and stores the data of the decoded macroblock before the post filter process is performed. In addition, the image memory 19 stores the data of the macroblock after the post filter process is performed. In particular, as for a macroblock that is located in the clean region and that includes pixels in the non-clean region in the reference region of the deblocking filter, the image memory 19 stores the data of the macroblock for which the display filter process has been performed and the data of the macroblock for which the decoding filter process has been performed. Then, the image memory 19 supplies the data of the macroblocks to the motion compensation unit 16 and the intra-prediction unit 17 in order to generate a predicted image. The image memory 19 outputs the data of each macroblock. Note that the image memory 19 stores data corresponding to a predetermined number of pictures, set in advance, and, when the amount of stored data exceeds the amount corresponding to that predetermined number, the pictures are discarded from the pictures that are older in the order of encoding.

The moving image decoding apparatus 1 reconstructs the pictures by combining the reconstructed macroblocks, per picture, according to the order of encoding. Then, the combining unit reconstructs the moving image data by placing the pictures in the order of time. The moving image decoding apparatus 1 outputs the reconstructed moving image data. The output moving image data is stored in a storage device (not illustrated). Furthermore, moving image data including pictures created using the display macroblock data generated by the post filter unit 18 is displayed on a display apparatus (not illustrated) that is connected to the moving image decoding apparatus 1.

Figure 13:
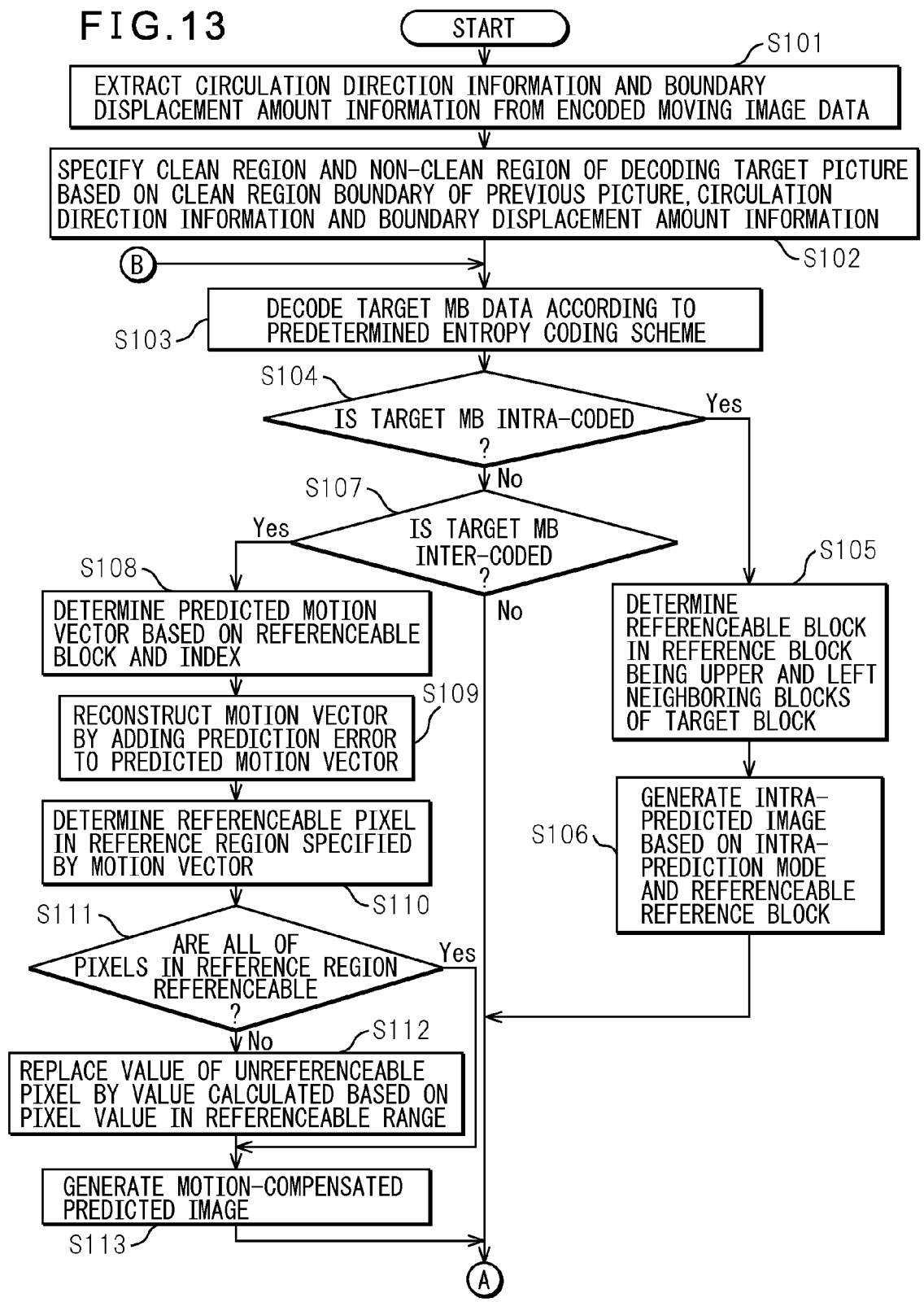
FIG. 13 is an operation flowchart of a moving image decoding process according to one embodiment.
Figure 14:
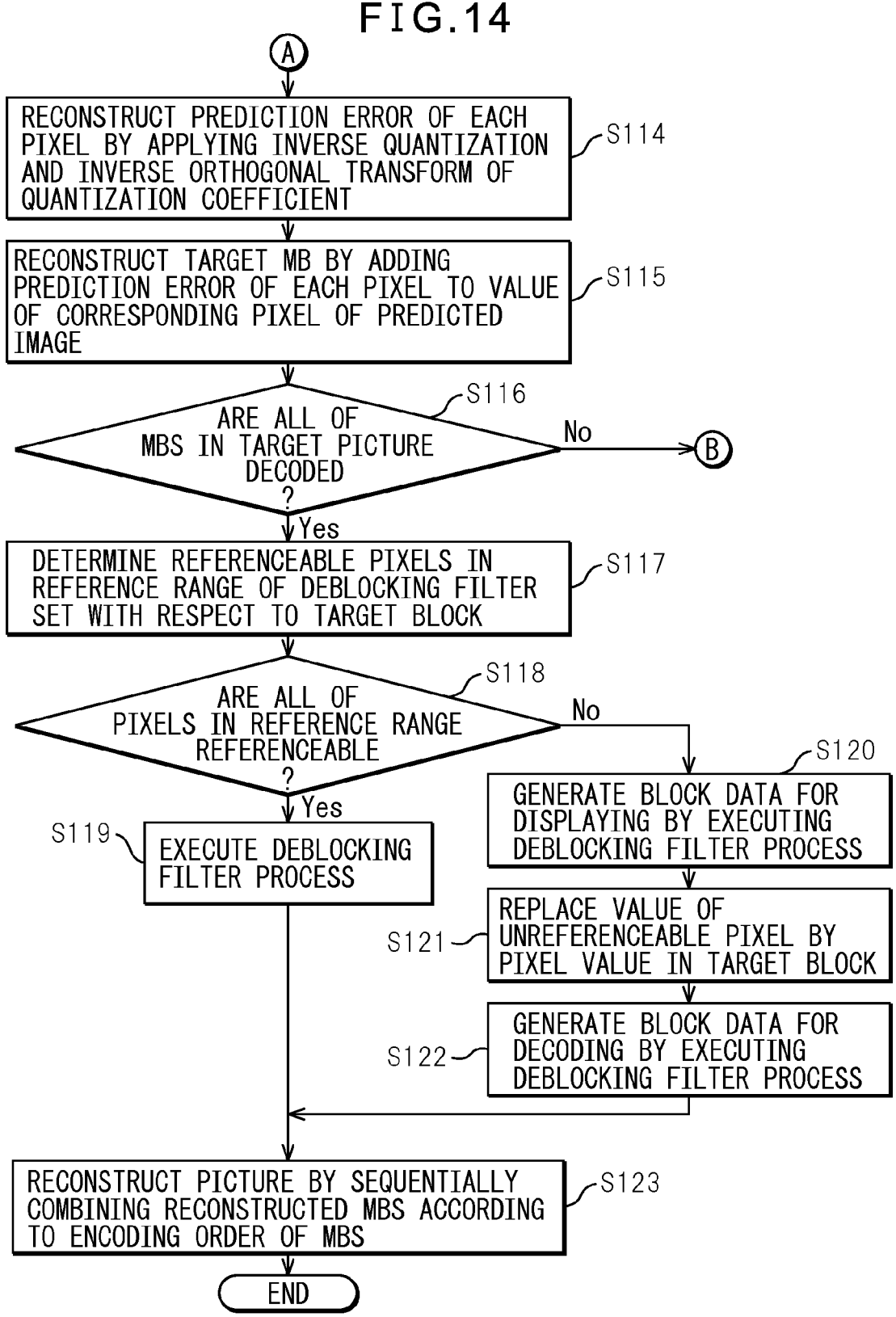
FIG. 14 is an operation flowchart of a moving image decoding process according to one embodiment.

FIG. 13 and FIG. 14 are each an operation flowchart of the moving image decoding process according to one embodiment. Note that the moving image decoding apparatus 1 executes the moving image decoding process per picture.

The entropy decoding unit 10 extracts the circulation direction information and the boundary displacement amount information from encoded moving image data (step S101). Then, the entropy decoding unit 10 output the circulation direction information and the boundary displacement amount information to the region classification unit 11.

The region classification unit 11 specifies the clean region and the non-clean region of the decoding target picture, based on the clean region boundary of the previous picture, the circulation direction information and the boundary displacement amount information (step S102). Then, the region classification unit 11 outputs information representing the clean region and the non-clean region of the decoding target picture to the referenceability determining unit 12.

The entropy decoding unit 10 decodes the macroblock data of the decoding target macroblock according to a predetermined entropy coding scheme (step S103). Then, the entropy decoding unit 10 determines whether or not the decoding target macroblock is intra-prediction coded (step S104). When the encoding mode included in the macroblock data of the decoding target macroblock indicates intra-prediction coding, the entropy decoding unit 10 determines that the decoding target macroblock is intra-prediction coded.

When the decoding target macroblock is intra-prediction coded (step S104—Yes), the entropy decoding unit 10 reports to the selector 15 that the decoding target macroblock is intra-prediction coded. Furthermore, the entropy decoding unit 10 outputs the intra-prediction mode flag prevIntraPredModeFlag with respect to each decoding target block in the decoding target macroblock, to the intra-prediction unit 17.

The intra-prediction unit 17 sets the upper and left neighboring reference blocks of the decoding target block to the reference region, and notifies the referenceability determining unit 12 of the position of the decoding target block and the position and range of the reference region. Among the upper and left neighboring reference blocks of the decoding target block, the referenceability determining unit 12 determines the referenceable blocks (step S105). Then, the referenceability determining unit 12 notifies the intra-prediction unit 17 of the determined result.

The intra-prediction unit 17 determines the intra-prediction mode based on the intra-prediction mode flag prevIntraPredModeFlag. Then, the intra-prediction unit 17 generates an intra-predicted image based on the intra-prediction mode and the referenceable reference blocks (step S106). Note that the reference blocks defined by the intra-prediction mode are unreferenceable, the intra-prediction unit 17 does not generate an intra-predicted image, and determines that the decoding of the decoding target block has failed. The intra-prediction unit 17 outputs the intra-predicted image to the selector 15.

On the other hand, when the decoding target macroblock is not intra-prediction coded (step S104—No), the entropy decoding unit 10 determines whether or not the decoding target macroblock is inter-coded (step S107). When the encoding mode included in the macroblock data of the decoding target macroblock indicates inter-coding, the entropy decoding unit 10 determines that the decoding target macroblock is inter-coded.

When the decoding target macroblock is inter-coded (step S107—Yes), the entropy decoding unit 10 reports to the selector 15 that the decoding target macroblock is inter-coded. Furthermore, the entropy decoding unit 10 outputs the motion parameters to the motion compensation unit 16. Then, the motion compensation unit 16 determines the region including the blocks that may be referenced to determine a predicted motion vector with respect to the decoding target block in the decoding target macroblock to the reference region, and outputs the position and range of the reference region, to the referenceability determining unit 12, with the position of the decoding target block. The referenceability determining unit 12 determines the reference blocks in the reference region. Then, the referenceability determining unit 12 notifies the motion compensation unit 16 of the referenceable blocks.

The motion compensation unit 16 determines a predicted motion vector based on the referenceable blocks and the index pmvIdx (step S108). Then, the motion compensation unit 16 adds the prediction error between a motion vector and the predicted motion vector to the predicted motion vector to reconstruct the motion vector (step S109).

The motion compensation unit 16 determines that the region specified by the motion vector is the reference region. Then, the motion compensation unit 16 outputs the position and range of the reference region to the referenceability determining unit 12, with the position of the decoding target block. The referenceability determining unit 12 determines the referenceable pixel range in the reference region specified by the motion vector (step S110). Then, the referenceability determining unit 12 notifies the motion compensation unit 16 of the determined result.

The motion compensation unit 16 determines whether or not all of the pixels in the reference region are referenceable (step S111). When a part of the pixels in the reference region is unreferenceable (step S111—No), the motion compensation unit 16 replaces the values of the unreferenceable pixels by the values calculated based on the pixel values in the referenceable range (step S112).

After step S112, or when all of the pixels in the reference region are referenceable in step S111 (step S111—Yes), the motion compensation unit 16 generates a motion-compensated predicted image based on the reference region and the motion vector (step S113). Then, the motion compensation unit 16 outputs the motion-compensated predicted image to the selector 15.

As illustrated in FIG. 14, the inverse-quantizing and orthogonal transform unit 13 reconstructs a set of orthogonal transform coefficients by performing inverse-quantization of the quantization coefficients, and reconstructs the prediction error of each pixel by performing an inverse orthogonal transform of the set of the orthogonal transform coefficients (step S114).

The adder 14 reconstructs the decoding target macroblock by adding the value of a corresponding pixel in the predicted image received from the selector 15 to the prediction error of each pixel (step S115).

The moving image decoding apparatus 1 determines whether or not all of the macroblocks in the decoding target picture have been decoded (step S116). When a part of the macroblocks is not decoded (step S116—No), the moving image decoding apparatus 1 repeats the processes of and after step S103.

On the other hand, when all of the macroblocks in the decoding target picture are decoded (step S116—Yes), the post filter unit 18 sets the target block, sequentially, in the decoding target picture. Then, the post filter unit 18 makes the reference range of the deblocking filter that is set with respect to the target block be the reference region. Then, the post filter unit 18 notifies the referenceability determining unit 12 of the position and range of the reference region with the position of the target block. The referenceability determining unit 12 determines the referenceable pixels in the reference range of the deblocking filter that is set with respect to the target block (step S117). Then, the referenceability determining unit 12 notifies the post filter unit 18 of the determined result. The post filter unit 18 determines whether or not all of the pixels in the reference range are referenceable (step S118).

When all of the pixels in the reference range are referenceable (step S118—Yes), the post filter unit 18 executes the deblocking filter process (step S119). On the other hand, when a part of the pixels in the reference range is unreferenceable (step S118—No), the post filter unit 18 executes the deblocking filter process to generate display block data (step S120).

Furthermore, the post filter unit 18 replaces the values of the unreferenceable pixels by the pixel values in the target block (step S121). Then, the post filter unit 18 executes the deblocking filter process using the pixel values in the reference range in which a part of the pixel values has been replaced, to generate decoding block data (step S122).

After step S119 or step S122, the moving image decoding apparatus 1 reconstructs the decoding target picture by sequentially combining the reconstructed macroblocks following the encoding order of the macroblocks (step S123). Then, the moving image decoding apparatus 1 finishes the moving image decoding process for one picture. Note that moving image decoding apparatus 1 may perform the processes of steps S107 to S113, before the processes of steps S104 to S106.

As described above, the moving image decoding apparatus according to one embodiment specifies the position of the clean region boundary in each picture, based on information that is included in encoded moving image data and that represents the circulation direction of the clean region boundary and the amount of displacement of the clean region boundary. Consequently, the encoded moving image data to which the moving image decoding apparatus sets the target of decoding does not have to include slice headers that indicate the position of the clean region boundary per picture. Furthermore, the information representing the circulation direction of the clean region boundary has only to be inserted once per refresh cycle, in encoded moving image data. The information representing the amount of displacement of the clean region boundary is also placed at the top of the data of each picture. Consequently, since slice headers are not inserted in the middle of encoded data of pictures, even when CABAC is used as the entropy coding scheme, it is possible to reduce the number of times context initialization occurs. Consequently, the moving image decoding apparatus is able to suppress the decrease of the rate of entropy coding. Furthermore, although the motion vectors of blocks that belong to slices other than the slice to which the decoding target block belongs are unable to be referenced, since the slice headers are not included in the middle of encoded data of pictures, this limit is alleviated, and the rate of motion vector prediction improves.

Furthermore, the moving image encoding apparatus is able to define the circulation direction of the clean region boundary freely, only by setting the information representing the circulation direction of the clean region boundary and the information representing the amount of displacement of the clean region boundary. Consequently, for example, by setting the circulation direction of the clean region boundary to substantially match the direction in which the image captured in pictures moves every scene, the possibility that optimal motion vectors can be used improves with respect to the macroblocks in the clean region.

Note that the present invention is not limited the above embodiment. For example, the moving image decoding apparatus does not have to include the post filter unit. In this case, the processes of and after step S117 in FIG. 14 are omitted.

Furthermore, according to another embodiment, the clean region boundary may be defined, in encoded moving image data, by the direction of the clean region boundary and the amount of displacement of the clean region boundary between two consecutive pictures.

Figure 15:
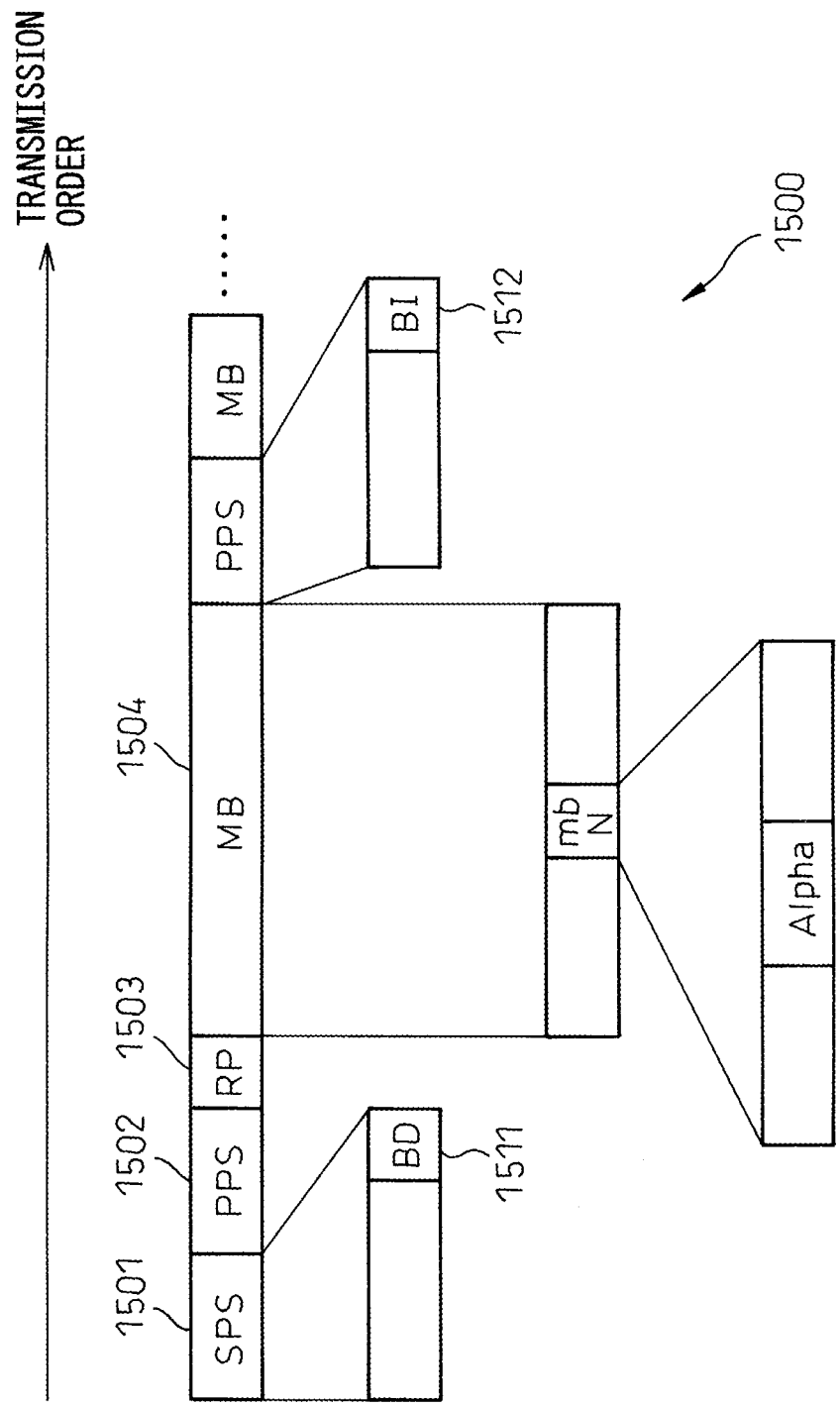
FIG. 15 is a diagram illustrating a structure of encoded moving image data according to another embodiment.

FIG. 15 is a diagram illustrating a structure of encoded moving image data according to another embodiment. The encoded moving image data 1500 includes SPS 1501, PPS 1502, RP 1503, and MB 1504. The encoded moving image data 1500 is different from the encoded moving image data 300 illustrated in FIG. 3 in that the SPS 1501 includes boundary direction information instead of circulation direction information and in that the PPS 1502 includes boundary information instead of boundary displacement amount information. The other parameters included in the encoded moving image data 1500 are the same as the corresponding parameters of the encoded moving image data 300, so that the boundary direction information and the boundary information will be illustrated below.

The boundary direction information (Boundary Direction: BD) 1511 represents the direction of the clean region boundary in pictures. Note that the direction of the clean region boundary is orthogonal to the circulation direction of the clean region boundary, and therefore the BD 1511 is also an example of information representing the circulation direction of the clean region boundary. In the present embodiment, the BD 1511 includes a two-bit signal BoundaryDirection. The meaning of BoundaryDirection is defined as follows:

"00": The clean region boundary is located on the horizontal line connecting between the positions of the picture $(0, \Delta)$ and $(\text{width}-1, \Delta)$. Note that the position $(x, y)$ represents the position of the horizontal coordinate x and the vertical coordinate y, where the pixel in the upper left end of the picture is the origin. Furthermore, the width is the number of pixels in the picture in the horizontal direction (in other words, the width of the picture). $\Delta$ is the clean region boundary position, and is defined by the boundary information. Note that the horizontal line itself is included in the clean region.

"01": The clean region boundary is located on the vertical line connecting between the positions of the picture $(\Delta, 0)$ and $(\Delta, \text{height}-1)$. Note that the height is the number of pixels in the picture in the vertical direction (in other words, the height of the picture). Note that the vertical line itself is included in the clean region.

"10": The clean region boundary is located on the line separating the region including up to the $\Delta$-th macroblock from the first position of the picture (for example, the upper left end), following the order of raster scan, and the other macroblocks. Note that the line itself is included in the clean region.

The boundary information (Boundary Information: BI) 1512 includes the parameter boundaryDistance, which represents the amount of displacement of the clean region boundary between two consecutive pictures, and the parameter offsetPosition for specifying the clean region. boundaryDistance is a positive or negative integer, and the clean region boundary position $\Delta$ of the decoding target picture is calculated according to the following equations.

$$\Delta = \Delta' + (\text{boundaryDistance} * \text{blockSize}) \text{ (when BoundaryDirection is "00" or "01")}$$

$$\Delta = \Delta' + \text{boundaryDistance (when BoundaryDirection is "10")}$$

Note that $\Delta'$ is the clean region boundary position in the previous picture of the decoding target picture. When the decoding target picture is a refresh picture and boundaryDistance is positive, $\Delta'$ is set to 0. Furthermore, when the decoding target picture is a refresh picture and boundaryDistance is negative, $\Delta'$ is set to (width−1) (when BoundaryDirection is "00") or set to (height−1) (when BoundaryDirection is "01"). blockSize is the height or width of blocks that serve as the unit of the orthogonal transform process. For example, in MPEG-2, blockSize is eight.

offsetPosition is a two-bit signal, and, between the two regions separated by the clean region boundary, the region including the position designated by offsetPosition is the clean region. Note that the relationship between the value of offsetPosition and the position to be designated is defined as follows.

offsetPosition="00": Designated position=the upper left end of the picture offsetPosition="01": Designated position=the upper right end of the picture offsetPosition="10": Designated position=the lower left end of the picture offsetPosition="11": Designated position=the lower right end of the picture According to a modification example, the BI 1512 may further include the clean region identifier regionId. regionId is, for example, an integer that is 0 or greater and smaller than N. N is a value that is defined in advance. regionId is "0" at the top of the bit stream, and increases one every time a refresh picture appears. Then, regionId is set to "0" when reaching N. The blocks included in the clean region are assigned, as an identifier, the same value as regionId, and the blocks included in the non-clean region are assigned, as an identifier, the value of (regionId−1).

When the identifier of the decoding target block is idx1 and the identifier of the reference block, which is a block included in the reference region, is idx2, the referenceability determining unit 12 determines that the reference block to satisfy the following conditions is unreferenceable.

$$(idx1 > idx2) \text{ or } (idx2 - idx1 \geq N/2)$$

According to yet another embodiment, the direction of the clean region boundary may be set to be approximately parallel to a diagonal line of the picture. For example, when the direction of the clean region boundary is approximately parallel to the diagonal line connecting between the upper right end and the lower left end of the picture, the clean region boundary moves from the upper left end to the lower right end of the picture. In this case, the position of the clean region boundary is defined by the variable M. The macroblock at the upper left end of the picture is Block (0, 0), and the macroblock that is a-th from the left end of the picture, to the right in the horizontal direction, and that is b-th from the upper end of the picture, downward in the vertical direction, is represented by Block (a, b). In this case, the clean region boundary is the boundary between the macroblocks satisfying the condition Block (a,b)|(a+b)≤M and the rest of the macroblocks. Then, the variable M is obtained, for example, as the value given by adding the value of boundaryDistance included in the boundary information, to the variable M' for the previous picture.

According to yet another embodiment, the post filter unit may remove the quantization error by applying a low-pass, two-dimensional spatial filter to the pixels of a picture before the post filter process is performed. In this case, the filter coefficients of the two-dimensional spatial filter are stored as entropy-coded values in, for example, the picture parameter region of encoded moving image data. Then, the entropy decoding unit decodes the filter coefficients and outputs the decoded filter coefficients to the post filter unit.

For example, when all of the pixels which are referenced by the two-dimensional spatial filter are referenceable, the post filter unit executes the two-dimensional spatial filter process according to the following equation. In other words, when the pixels that are subject to the two-dimensional spatial filter process belong to the non-clean region, or when all of the pixels which the two-dimensional spatial filter references belong to the clean region, the following equation is applied.

$$p'(x, y) = \sum_{j=-2}^{2} \sum_{i=-2}^{2} p(x+i, y+j) w(i, j) / D \quad (4)$$

p(x, y) is the value of the pixel of the horizontal coordinate x and the vertical coordinate y in the picture before the filter process is applied, and p'(x, y) is the value of the pixel of the horizontal coordinate x and the vertical coordinate y in the picture after the filter process is applied. Furthermore, w(i, j) is filter coefficient, and, for example, is a coefficient value corresponding to a two-dimensional Gaussian filter. D is a normalization factor. In this case, the two-dimensional spatial filter includes 5×5 taps. Note that the post filter unit is not limited to a filter to include 5×5 taps, and may use, for example, a filter including 3×3 or 7×7 taps, or may use a filter in which the number of taps in the vertical direction and the number of taps in the horizontal direction are different.

On the other hand, when a part of the pixels referenced by the two-dimensional spatial filter is unreferenceable, the post filter unit executes the two-dimensional spatial filter process according to the following equation. In other words, when block to which the pixels subject to filter process belong to the clean region, the neighboring blocks belong to the non-clean region and the region referenced by the two-dimensional spatial filter is over the two blocks, the following equation is applied.

$$p'(x, y) = \sum_{j=-2}^{2} \sum_{i=-2}^{2} q(x+i, y+j) w(i, j) / D \quad (5)$$

q(x, y) is the value of the pixel of the horizontal coordinate x and the vertical coordinate y, in the picture in which the values of the unreferenceable pixels are replaced by the values of the referenceable pixels, in the picture before filter process is applied. In this way, the post filter unit replaces the values of the unreferenceable pixels by the values of the referenceable pixels and then executes the spatial filter process, thereby realizing a spatial filter process which does not reference the unreferenceable pixels.

Figure 16A:
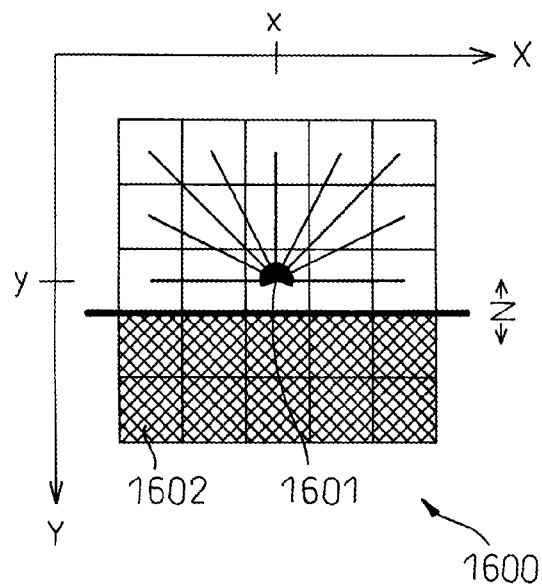
FIG. 16A is a diagram illustrating an example of a representative case where part of a reference region which a filter references is unreferenceable.
Figure 16B:
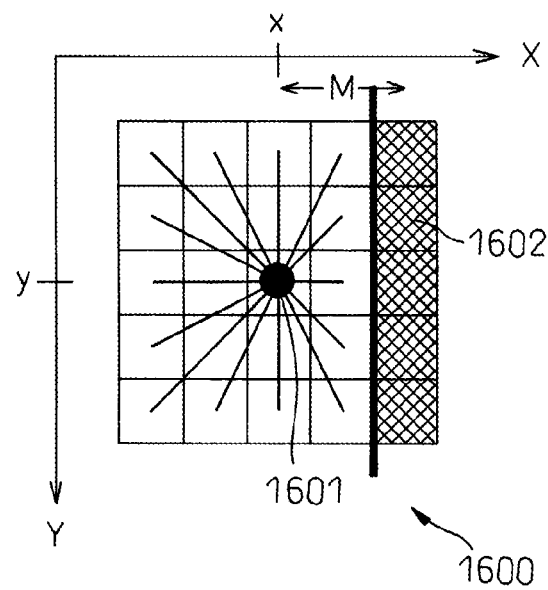
FIG. 16B is a diagram illustrating another example of a representative case where part of a reference region which a filter references is unreferenceable.
Figure 16C:
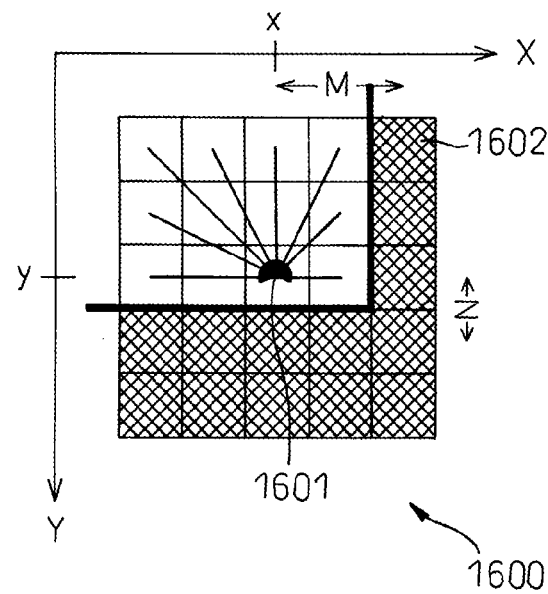
FIG. 16C is a diagram illustrating yet another example of a representative case where part of a reference region which a filter references is unreferenceable.
Figure 16D:
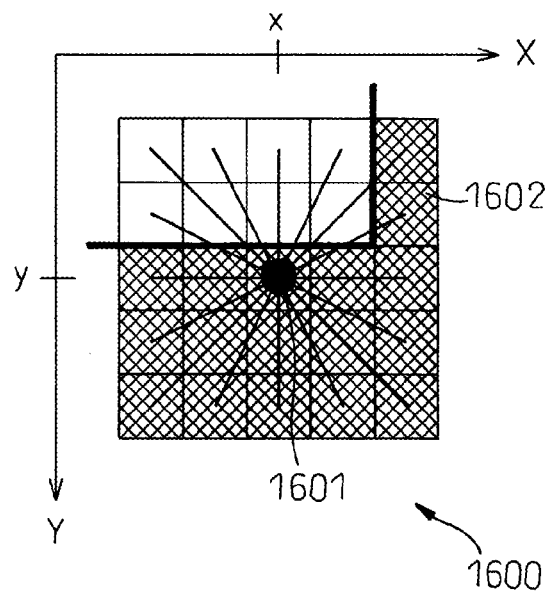
FIG. 16D is a diagram illustrating a case where a pixel to be filtered belongs to the non-clean region.

FIG. 16A to FIG. 16C each illustrate a representative case where a part of the reference region which the filter references is unreferenceable. Furthermore, FIG. 16 D illustrates a case where the pixels that are subject to the filter process belong to the non-clean region. In FIG. 16A to FIG. 16 D, the block 1600 represents the entire reference region which is referenced by the filter. Then, the pixel 1601, which is located at the center of the block 1600, is the attention pixel for which the filter process is performed, and the position is represented by the horizontal direction coordinate x and the vertical direction coordinate y, where the pixel of the upper left end is the origin. Then, the region 1602 represents the non-clean region. In FIG. 16A to FIG. 16C, the non-clean region is the unreferenceable region. Note that the region that is left after removing the unreferenceable region from the reference region 1600 is the referenceable region. The number of pixels from the attention pixel 1601 to the unreferenceable region in the vertical direction is represented by N, whereas the number of pixels from the attention pixel 1601 to the unreferenceable region in the horizontal direction is represented by M. Furthermore, in FIG. 16A to FIG. 16D, the pixels that overlap the lines that extend in a radiating manner from the attention pixel 1601 are the pixels to be used in filtering calculation.

In FIG. 16A, the unreferenceable region 1602 is located on the lower side in the reference region. In FIG. 16B, the unreferenceable region 1602 is located on the right side in the reference region. Furthermore, in FIG. 16C, the unreferenceable region 1602 is located on the right side and on the lower side in the reference region.

The post filter unit calculates q(x, y) by, for example, replacing the values of the pixels in the unreferenceable region by the values of some pixels in the referenceable region. For example, with respect to the cases of FIG. 16A to FIG. 16C, the post filter unit places the origin on the upper left, and calculates the pixel value q(X, Y) of the horizontal coordinate X and the vertical coordinate Y as follows:

Case 1 (FIG. 16A): When the unreferenceable region is located lower in the reference region $$q(X,Y)=p(X,Y)|(Y<y+N) \text{ (in FIG. 16}A, N=1)$$

$$q(X,Y)=p(X,y+N-1)|(Y\geq y+N)$$

Note that, when the unreferenceable region is located higher in the reference region, similarly, q(X, Y) is calculated by replacing the values of the pixels in the unreferenceable region by the values of pixels in the referenceable region to neighbor the unreferenceable region.

Case 2 (FIG. 16B): When the unreferenceable region is located on the right side in the reference region $$q(X,Y)=p(X,Y)|(X<x+M) \text{ (in FIG. 16}B, M=2)$$

$$q(X,Y)=p(x+M-1,Y)|(X\geq x+M)$$

Note that, when the unreferenceable region is located on the left side in the reference region, similarly, q(X, Y) is calculated by replacing the values of the pixels in the unreferenceable region by the values of pixels in the referenceable region to neighbor the unreferenceable region.

Case 3 (FIG. 16C): When the unreferenceable region is located on the lower side and the right side in the reference region $$q(X,Y)=p(X,Y)|(X<x+M) \text{ and } (Y<y+N) \text{ (in FIG. 16C, } M=2 \text{ and } N=1)$$

$$q(X,Y)=p(x+M-1,y+N-1)|(X\geq x+M \text{ or } Y\geq y+N)$$

Note that, when the unreferenceable region is located on the left side and the upper side in the reference region, q(X, Y) is calculated by replacing the values of the pixels in the unreferenceable region by the value of the pixel of the upper left end in the referenceable region. In the case illustrated in FIG. 16D, whether the pixels which are referenced by the filter belong to the clean region or belong to the non-clean region, the post filter unit executes the two-dimensional spatial filter process according to equation (4).

Note that, when a part of the pixels referenced by the spatial filter is unreferenceable, the post filter unit may replace the values of the unreferenceable pixels by a predetermined value (for example, 128), and then executes the spatial filter process.

According to yet another modification, when a part of the pixels in the region referenced in order to generate a motion-compensated predicted image is unreferenceable, the motion compensation unit finds the edge direction of the image that is captured in the referenceable part in the region to be referenced, and near the clean region boundary. Note that the edge direction is calculated by, for example, performing an edge detection process in various directions using a sobel filter and specifying the direction where the edge intensity is the maximum. Then, the motion compensation unit may extrapolate the pixel values in the unreferenceable region such that the pixel values are substantially equal along the edge direction.

When the pixels subject to the deblocking filter operation are in the clean region and the pixels in the neighboring blocks which the deblocking filter references are in the non-clean region, the post filter unit does not use the pixels in the neighboring blocks in the deblocking filter calculation. On the other hand, when the pixels subject to the deblocking filter operation are in the non-clean region and the neighboring blocks which the deblocking filter references belong to the clean region, the post filter unit uses the pixels in the neighboring blocks in the deblocking filter calculation. Furthermore, when the pixels that are subject to deblocking filter operation and the pixels in the neighboring blocks which the deblocking filter references are both in the non-clean region, the post filter unit may execute the deblocking filter operation defined in the MPEG-4 AVC/H.264 standard. Furthermore, when the pixels that are subject to deblocking filter operation and the pixels in the neighboring blocks which the deblocking filter references are both in the clean region, the post filter unit may also execute the deblocking filter operation defined in the MPEG-4 AVC/H.264 standard.

According to yet another embodiment, the motion compensation unit may decode the predicted motion vector PMV of the decoding target block as follows. For example, assume that, as illustrated in FIG. 10A and FIG. 10B, the left, upper and upper-right neighboring blocks of the decoding target block at time T are bA, bB and bC, respectively.

The motion compensation unit calculates the predicted motion vector PMV according to the method of deriving predicted motion vectors defined by the standard. Note that, when determining whether or not the blocks bA, bB and bC are valid, instead of determining whether or not the blocks are located in different slices from the decoding target block, the motion compensation unit uses the determined results by the referenceability determining unit as to whether or not each block is referenceable.

According to yet another embodiment, the motion compensation unit may decode the predicted motion vector PMV as follows. For example, assume that, as illustrated in FIG. 10A and FIG. 10B, the left, upper and upper-right neighboring blocks of the decoding target block at time T are bA, bB and bC, respectively. In the picture at time (T−1), assume that the block that is located in the same position as the decoding target block is col.

When the block col is valid, one-bit data mvcompSel is attached, per inter-predicted block of data mb of each macroblock included in encoded moving image data. Based on the value of mvcompSel, the predicted motion vector PMV is calculated as follows.

mvcompSel=0: the motion prediction vector PMV according to the method of deriving predicted motion vectors defined by the MPEG-4 AVC/H.264 standard.

mvcompSel=1: PMV=Vcol

When the block col is not valid, the parameter mvcompSel is not defined in the inter-predicted block of data mb of each macroblock. In this case, the motion compensation unit calculates the predicted motion vector PMV according to the method of deriving predicted motion vectors defined by the MPEG-4 AVC/H.264 standard.

Next, a moving image encoding apparatus according to another embodiment will be illustrated. The moving image encoding apparatus according to the present embodiment encodes moving image data according to the intra-slice scheme. Then, the moving image encoding apparatus includes clean region boundary circulation direction information and clean region boundary displacement amount information from the previous picture, in encoded moving image data, instead of inserting slice headers that represent the boundary position of the clean region, per picture. By this means, the moving image encoding apparatus improves the coding rate by reducing the amount of information representing the clean region boundary, preventing the coding rate from decreasing due to slice header insertion, and allowing the circulation direction of the clean region boundary to change flexibly.

Figure 17:
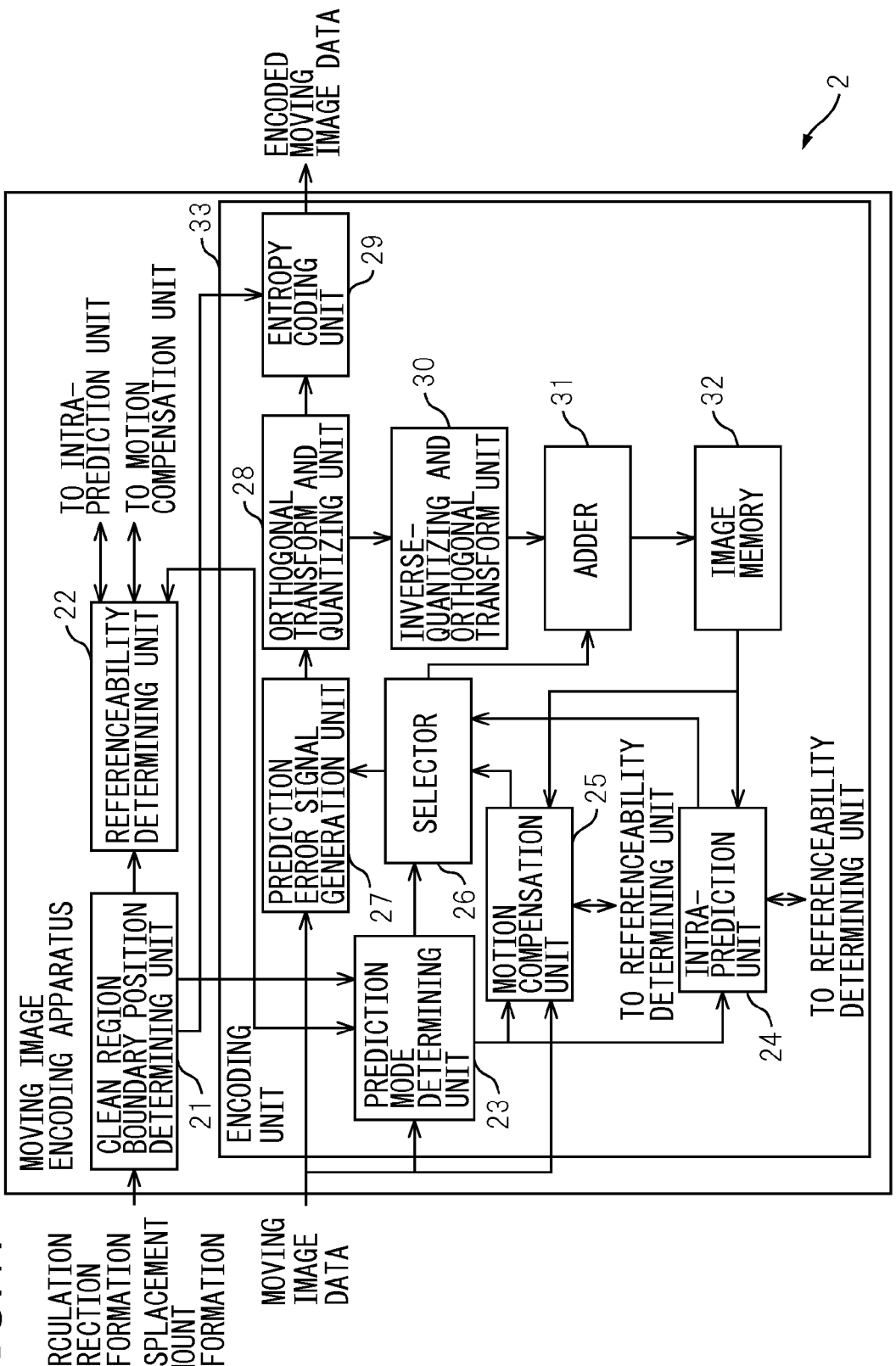
FIG. 17 is a schematic configuration diagram of a moving image encoding apparatus according to another embodiment.

FIG. 17 is a schematic configuration diagram of the moving image encoding apparatus. The moving image encoding apparatus 2 includes a clean region boundary position determining unit 21, a referenceability determining unit 22, and an encoding unit 33. The encoding unit 33 includes a prediction mode determining unit 23, an intra-prediction unit 24, a motion compensation unit 25, a selector 26, a prediction error signal generation unit 27, an orthogonal transform and quantizing unit 28, an entropy coding unit 29, an inverse-quantizing and orthogonal transform unit 30, an adder 31, and an image memory 32. The units included in the moving image encoding apparatus 2 are formed as a separate circuit. Alternatively, the units included in the moving image encoding apparatus 2 may be installed in the moving image encoding apparatus 2 as one integrated circuit, in which circuits corresponding to the individual units are integrated. Furthermore, the units included in the moving image encoding apparatus 2 may be function modules to be realized by a computer program to be executed on a processor included in the moving image encoding apparatus 2.

The clean region boundary position determining unit 21 is an example of a region classification unit, and determines the position of the clean region boundary in each picture such that the clean region occupies the entire picture over a predetermined cycle. The clean region boundary position determining unit 21 receives information representing the circulation direction of the clean region boundary from a control unit (not illustrated). Alternatively, the clean region boundary position determining unit 21 switches the circulation direction in a cycle of an integral multiple of the refresh cycle. For example, the clean region boundary position determining unit 21 calculates the mode or median of a plurality of motion vectors that are calculated with respect to a predetermined number of pictures immediately before a refresh picture, and determines the direction represented by the mode or median. Then, among a plurality of clean region boundary circulation directions that can be set, the clean region boundary position determining unit 21 may set the direction that is the closest to the direction represented by the mode or median as the circulation direction of the clean region boundary.

The clean region boundary position determining unit 21 determines the position of the clean region boundary in the encoding target picture based on the position of the clean region boundary in the previous picture, the amount of displacement of the clean region boundary between two consecutive pictures, and the circulation direction of the clean region boundary. Note that the clean region boundary position determining unit 21 receives information representing the amount of displacement of the clean region boundary from a control unit (not illustrated). The clean region boundary position determining unit 21 is able to determine the position of the clean region boundary by performing the same operation as the operation as by the region classification unit 11 of the moving image decoding apparatus 1.

The clean region boundary position determining unit 21 outputs information representing the range of the clean region and the range of the non-clean region in the encoding target picture, determined based on the clean region boundary, to the referenceability determining unit 22, with the identifier of the encoding target picture. The clean region boundary position determining unit 21 notifies the prediction mode determining unit 23 of the position of the clean region boundary and the range of the clean region in the encoding target picture. Furthermore, to determine the position of the clean region boundary in pictures after the encoding target picture, the clean region boundary position determining unit 21 stores the position of the clean region boundary in the encoding target picture in, for example, an embedded memory. Furthermore, the clean region boundary position determining unit 21 notifies the entropy coding unit 29 of information representing the circulation direction of the clean region boundary and information representing the amount of displacement of the clean region boundary between two consecutive pictures.

The referenceability determining unit 22 receives the position of each block (in other words, the encoding target block) in the encoding target macroblock, and the position and size of the reference region, from the prediction mode determining unit 23, the intra-prediction unit 24 or the motion compensation unit 25. Then, the referenceability determining unit 22 determines whether or not the encoding target block is included in the clean region of the encoding target picture. Furthermore, the referenceability determining unit 22 determines whether or not the pixels in the reference region are included in the clean region of the reference picture. Then, similar to the referenceability determining unit 12 of the moving image decoding apparatus 1, the referenceability determining unit 22 determines whether or not it is possible to reference the pixels in the reference region according to the determined results. Then, the referenceability determining unit 22 outputs information representing the referenceable pixels in the reference region to the prediction mode determining unit 23, the intra-prediction unit 24 or the motion compensation unit 25.

The encoding unit 33 sequentially reads picture data of the moving image data to encode, in macroblock units, from a buffer memory (not illustrated) storing the moving image data to encode. Then, based on the pixels which the encoding target block can reference, the encoding unit 33 encodes the encoding target block. For this purpose, the units included in the encoding unit 33 operate as described below.

The prediction mode determining unit 23 determines a prediction mode to define the method of generating a predicted image for the encoding target block. When, for example, the encoding target macroblock belongs to the clean region, the prediction mode determining unit 23 sets the prediction mode of the encoding target macroblock to the intra-coding mode or the intra-prediction coding mode. In particular, since the macroblocks of the clean region are not able to select inter-coding in a refresh picture, the prediction mode determining unit 23 selects the intra-coding mode, which references only information of the macroblocks in the encoding target picture.

Furthermore, when the encoding target macroblock belongs to the clean region, the prediction mode determining unit 23 specifies the regions that have a possibility of being referenced when inter-coding or intra-prediction coding is performed, as reference regions. Then, the prediction mode determining unit 23 notifies the referenceability determining unit 22 of the position of the encoding target macroblock, and the position and range of the reference region for when the macroblock is inter-coded and for when the macroblock is intra-prediction coded.

Furthermore, when the encoding target macroblock belongs to the non-clean region, the prediction mode determining unit 23 sets the prediction mode of the encoding target macroblock to the intra-coding mode or the intra-prediction coding mode.

The prediction mode determining unit 23 receives the determined result as to whether or not each pixel in the reference region is referenceable, from the referenceability determining unit 22. Then, the prediction mode determining unit 23 calculates the cost, which is the evaluation value of the amount of encoded data of the macroblock, with respect to each encoding mode. Then, the prediction mode determining unit 23 sets the encoding mode to minimize the cost, to the encoding mode to be applied to the encoding target macroblock.

The cost for each encoding mode is calculated, for example, as follows.

$$costf = \sum_{i,j} |org_{i,j} - ref_{i,j}| + \lambda * (\text{Table}[mv1 - premv1]) \quad (6)$$

$$costi = \sum_{i,j} |org_{i,j} - AveMB|$$

costf and costi are the costs corresponding to the inter-coding mode and the intra-prediction coding mode, respectively. $Org_{i,j}$ represents the value of the pixel of the horizontal direction coordinate i and the vertical direction coordinate j included in the encoding target macroblock. Furthermore, $ref_{i,j}$ represents the value of the pixel of the horizontal direction coordinate i and the vertical direction coordinate j, included in the predicted image. Note that the prediction mode determining unit 23 generates a predicted image from the reference picture by the same method as in the intra-prediction unit 24 and the motion compensation unit 25. Furthermore, mv1 represents the motion vector for the encoding target macroblock, and premv1 represents the motion vector of the macroblock that was encoded immediately before. Note that premv1 is selected from the referenceable range with respect to the encoding target block. Furthermore, Table[a-b] outputs an estimated amount of code, which corresponds to the difference vector between a vector a and a vector b. For example, Table[a-b] may also be a reference table indicating the estimated amounts of code for various difference vectors. In addition, $\lambda$ is the weighting coefficient and is set, for example, to 1. AveMB is the average value of the pixel values included in the encoding target macroblock. Instead of AveMB, the pixel value of an intra-predicted image generated from the pixel values included in the neighboring macroblocks of the encoding target macroblock may be used. In this case, only an intra-predicted image that can be generated from the referenceable macroblocks among the macroblocks to neighbor the encoding target macroblock is used. In this case, the prediction mode determining unit 23 calculates the cost for each intra-prediction mode separately. Note that the cost for the intra-prediction mode, in which an intra-predicted image are unable to be generated, is set to a significantly large value, to be greater than the cost by other encoding modes.

The prediction mode determining unit 23 calculates the cost for each encoding mode that is to be selected, according to equations (6). Then, the prediction mode determining unit 23 selects the encoding mode to minimize the cost, as the encoding mode to be applied to the encoding target macroblock.

The prediction mode determining unit 23 notifies the selector 26 and the entropy coding unit 29 of the selected encoding mode. When the selected encoding mode is the intra-prediction coding mode, the prediction mode determining unit 23 notifies the intra-prediction unit 24 of generating a predicted image. On the other hand, when the selected encoding mode is the inter-coding mode, the prediction mode determining unit 23 notifies the motion compensation unit 25 of generating a motion-compensated predicted image.

The intra-prediction unit 24 generates a predicted image according to the intra-prediction mode selected by the prediction mode determining unit 23. At this time, the intra-prediction unit 24 generates a predicted image, according to, for example, the horizontal mode, the DC mode, or the vertical mode, defined in MPEG-4 AVC/H.264. The intra-prediction unit 24 passes the generated predicted image to the selector 26.

When the encoding target macroblock is inter-coded, the motion compensation unit 25 calculates a motion vector using the encoding target block in the encoding target macroblock and the reference picture. The motion vector represents the amount of displacement in space between the encoding target block and the reference picture that is the most similar to the block.

The motion compensation unit 25 notifies the referenceability determining unit 22 of the position of the encoding target block, and the position and range of the reference region on the reference pictures that have a possibility of being referenced in order to find the motion vector. Then, the motion compensation unit 25 receives information representing the referenceable pixels in the reference region, from the referenceability determining unit 22.

By executing block matching between the encoding target block and the reference pictures, the motion compensation unit 25 determines the reference picture that best matches the encoding target block, and the position on the picture including the reference picture. Note that, when part of the pixels in the reference region is unreferenceable, the motion compensation unit 25 limits the range on the reference picture, where block matching with the encoding target block is performed, to a range including in part the referenceable pixels indicted by the referenceability determining unit 22.

The motion compensation unit 25 sets the amount of displacement in the horizontal direction and the vertical direction between the position of the encoding target block on the picture and the region that best matches the block on the reference picture, as a motion vector. The motion compensation unit 25 generates a predicted image by performing motion compensation of the block best matching the encoding target block in the reference picture acquired from the image memory 32, based on the motion vector. Note that the motion compensation refers to the process of canceling the amount of positional displacement between the block represented by the motion vector and the block that is the most similar to the block on the reference picture, by displacing the position of the most similar block on the reference picture.

Furthermore, when unreferenceable pixels are included in the block (hereinafter simply referred to as "reference block") that best matches the encoding target block on the reference picture, the motion compensation unit 25 may calculate the motion compensation parameters. For example, when there are unreferenceable pixels on the lower side or on the upper side in the reference block, the motion compensation unit 25 calculates an average value PI of the values of the unreferenceable pixels located in the upper end or in the lower end of the reference block. Then, the motion compensation unit 25 calculates the value given by dividing the value (PI−PC), which is obtained by subtracting the average value PC of the pixels near the center of the reference block, from the average value PI, by the average value PC, as the motion compensation parameter alphaY with respect to the vertical direction. Likewise, when there are unreferenceable pixels on the right side or on the left side in the reference block, the motion compensation unit 25 calculates an average value PI of the values of the unreferenceable pixels located on the right end or on the left end of the reference block. Then, the motion compensation unit 25 calculates the value given by dividing the value (PI−PC), which is obtained by subtracting the average value PC of the pixels near the center of the reference block, from the average value PI, by the average value PC, as the motion compensation parameter alphaX with respect to the horizontal direction.

Similar to the motion compensation unit 16 of the moving image decoding apparatus 2, the motion compensation unit 25 replaces the values of the unreferenceable pixels in the reference block by the values calculated according to equations (1). Then, the motion compensation unit 25 generates a predicted image based on the reference block including the replaced pixel values. The motion compensation unit 25 passes the identifier of the reference picture to the entropy coding unit 29 with the motion vector and the motion compensation parameters. Furthermore, the motion compensation unit 25 passes the predicted image to the selector 26.

According to the encoding mode reported from the prediction mode determining unit 23, the selector 26 outputs the predicted image received from one of the intra-prediction unit 24 and the motion compensation unit 25, to the encoding unit 27 and the adder 31.

The prediction error signal generation unit 27 calculates the prediction error of each pixel in the encoding target macroblock, by executing difference calculation of the encoding target macroblock and the predicted image received from the selector 26. The prediction error signal generation unit 11 passes the prediction errors of the pixels to the orthogonal transform and quantizing unit 28.

By performing an orthogonal transform of the prediction errors of the pixels of the encoding target block in the encoding target macroblock, the orthogonal transform and quantizing unit 28 calculates a frequency signal representing the frequency components of the prediction errors in the horizontal direction and the frequency components of the prediction errors in the vertical direction. For example, by executing a discrete cosine transform (DCT) for the prediction errors as the orthogonal transform process, the orthogonal transform and quantizing unit 28 acquires a set of DCT coefficients per block as a frequency signal.

Next, the orthogonal transform and quantizing unit 28 quantizes the frequency signal. The quantization process is the process representing the signal values included in a given period by one signal value. Then, the given period is referred to as "quantization step size." For example, by cutting off the predetermined number of lower bits corresponding to the quantization step size from the frequency signal, the orthogonal transform and quantizing unit 28 quantizes the frequency signal. The quantization step size is determined by the quantization parameter. For example, the orthogonal transform and quantizing unit 28 determines the quantization step size to be used, according to a function representing the value of the quantization step size for the value of the quantization parameter. Furthermore, the function may be made a monotonically increasing function with the value of the quantization parameter, and set in advance.

Alternatively, a plurality of quantization matrices, which define the quantization step sizes corresponding to the frequency components of the horizontal direction and the vertical direction, are stored in a memory included in the orthogonal transform and quantizing unit 28. Then, the orthogonal transform and quantizing unit 28 selects a specific quantization matrix, in the quantization matrices, according to the quantization parameter. Then, the orthogonal transform and quantizing unit 28 references the selected quantization matrix and determines the quantization step size for each frequency component of the frequency signal.

The orthogonal transform and quantizing unit 28 may determine the quantization parameter according to any of various quantization parameter determining methods supporting moving image encoding standards such as MPEG-2, MPEG-4, MPEG-4 AVC/H.264, and/or the like. The orthogonal transform and quantizing unit 28 may use the quantization parameter calculation method related to MPEG-2 Standard Test Model 5. Note that, regarding the quantization parameter calculation method related to MPEG-2 Standard Test Model 5, see, for example, the URL specified by: http://www.mpeg.org/MPEG/MSSG/tm5/Ch10/Ch10.html By executing the quantization process, the orthogonal transform and quantizing unit 28 calculates the quantization coefficients and outputs the quantization coefficients to the entropy coding unit 29 and the inverse-quantizing and orthogonal transform unit 30.

By encoding the quantization coefficients received from the orthogonal transform and quantizing unit 28 and the motion vector received from the motion compensation unit 25 according to a predetermined entropy coding scheme, the entropy coding unit 29 generates an encoded signal having a compressed amount of data. For this purpose, the entropy coding unit 29 is able to use a Huffman coding scheme or an arithmetic coding scheme, as the predetermined entropy coding scheme.

Furthermore, the entropy coding unit 29 generates encoded moving image data having the structure illustrated in FIG. 3 or FIG. 15, to include the encoded signal, the prediction mode per macroblock, the circulation direction information, the boundary displacement amount information, and/or the like. Then, the moving image encoding apparatus 2 stores the encoded moving image data in a storage unit (not illustrated) including a magnetic recording medium, an optical recording medium, or a semi-conductor memory, or outputs the encoded moving image data to other devices.

The inverse-quantizing and orthogonal transform unit 30 performs inverse-quantization by multiplying the quantization coefficients received from the orthogonal transform and quantizing unit 28 by a predetermined number corresponding to the quantization step size determined by the quantization parameters. By means of the inverse-quantization, the frequency signal of an input macroblock—for example, a set of DCT coefficients—is reconstructed. Subsequently, the inverse-quantizing and orthogonal transform unit 30 applies an inverse orthogonal transform process to the frequency signal. For example, when the orthogonal transform and quantizing unit 28 performs the DCT process, the inverse-quantizing and orthogonal transform unit 30 executes an inverse-DCT process for the inverse-quantized signal. By executing the inverse-quantization process and the inverse orthogonal transform process for the quantized signal, the prediction error of each pixel of the encoding target macroblock, which has approximately the same information as the prediction error before encoding, is reconstructed. Then, the inverse-quantizing and orthogonal transform unit 30 outputs the reconstructed prediction error of each pixel to the adder 31.

The adder 31 reconstructs the encoding target macroblock by adding the prediction error of a corresponding pixel received from the inverse-quantizing and orthogonal transform unit 30, to the value of each pixel of the predicted image received from the selector 26. By combining the reconstructed macroblocks in the order of encoding, the adder 31 generates a reference picture that is used in order to generate a predicted image for the macroblocks to be encoded later. The adder 31 stores the acquired reference picture in the image memory 32.

The image memory 32 includes, for example, a semi-conductor memory. Then, the image memory 32 stores, temporarily, the reference picture received from the adder 31. Then, the image memory 32 supplies the reference picture to the intra-prediction unit 24, the motion compensation unit 25 and the prediction mode determining unit 23. Note that the image memory 32 stores a predetermined number of reference pictures, and, when the number of the reference pictures exceeds the predetermined number, discards the reference pictures from ones that are older in the order of encoding.

Note that the moving image encoding apparatus 2 may include the same post filter unit as the post filter unit included in the moving image decoding apparatus 1 illustrated in FIG. 2. Note that, in this case, even when part of the pixels in the region which is referenced by the filer is unreferenceable, the post filter unit generates only the decoding macroblock data and does not generate the display macroblock data.

Figure 18:
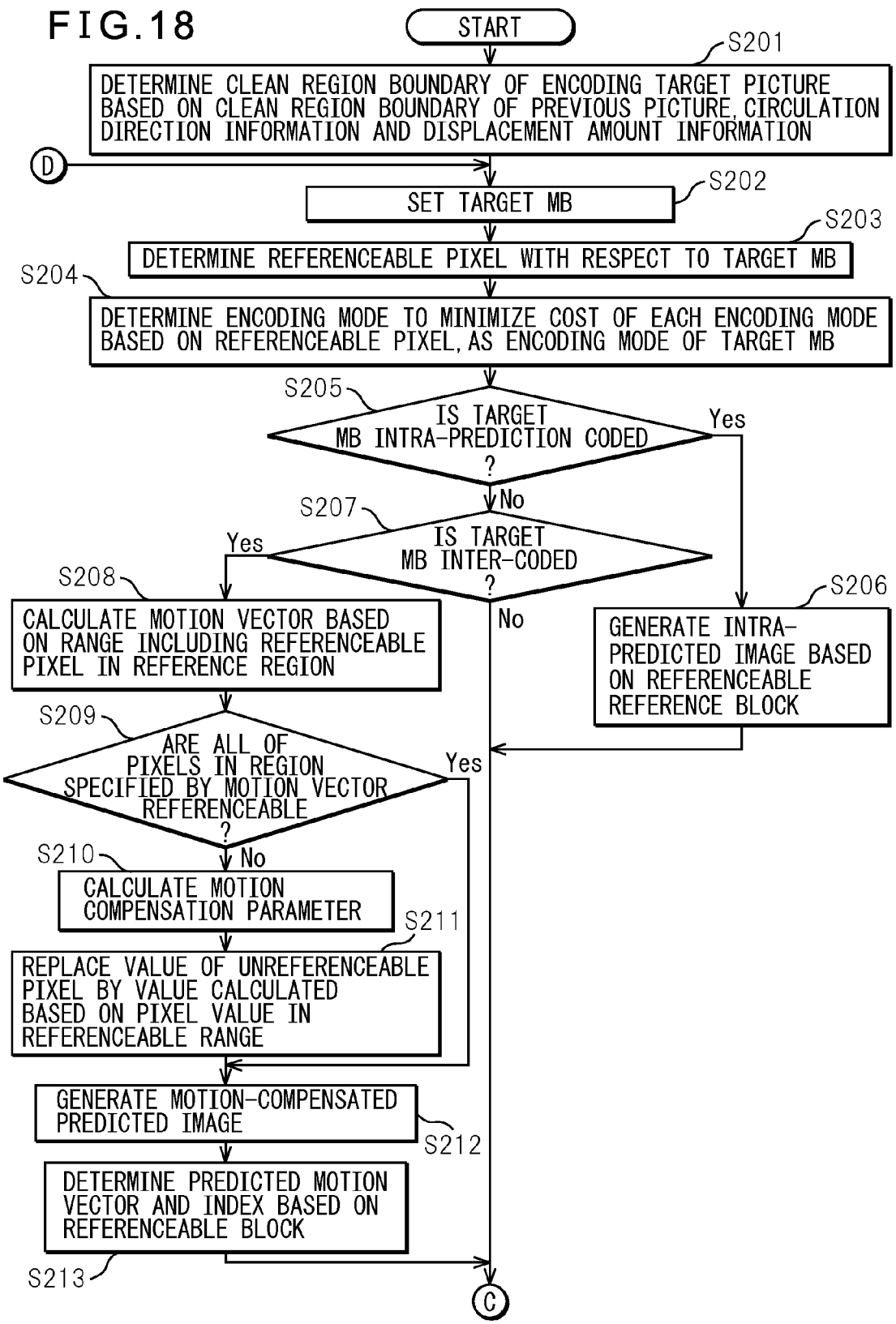
FIG. 18 is an operation flowchart of a moving image encoding process.
Figure 19:
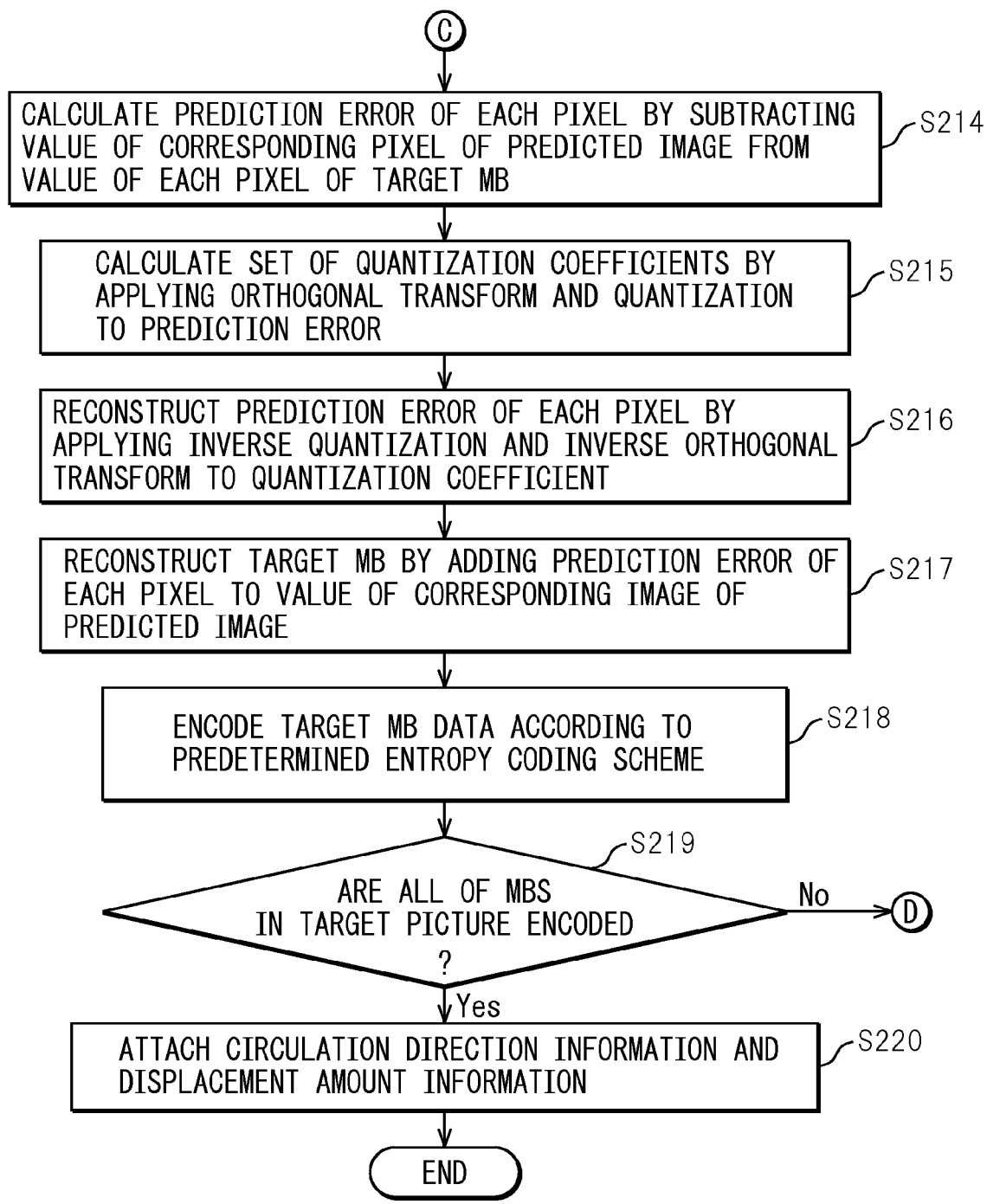
FIG. 19 is an operation flowchart of a moving image encoding process.

FIG. 18 and FIG. 19 are each an operation flowchart of the moving image encoding process executed by the moving image encoding apparatus 2. The moving image encoding apparatus 2 executes the moving image encoding process per picture included in moving image data.

The clean region boundary position determining unit 21 determines the clean region boundary of the encoding target picture, based on the clean region boundary of the previous picture, the circulation direction information and the displacement amount information (step S201). Then, the clean region boundary position determining unit 21 outputs information representing the range of the clean region and the range of the non-clean region, determined based on the clean region boundary, to the referenceability determining unit 22.

The moving image encoding apparatus 2 sets the encoding target macroblock (step S202). Then, the data of the encoding target macroblock is input in the prediction mode determining unit 23, the motion compensation unit 25 and the prediction error signal generation unit 27 of the encoding unit 33.

The prediction mode determining unit 23 sets a region on the encoding target picture and the reference picture, which has a possibility of being referenced in order to encode the encoding target macroblock, as a reference region, and notifies the referenceability determining unit 22 of the position and range of the reference region and the position of the encoding target macroblock. The referenceability determining unit 22 determines the referenceable pixels in the reference region (step S203). The referenceability determining unit 22 notifies the prediction mode determining unit 23 of the determined result. Based on the referenceable pixels, among the encoding modes, the prediction mode determining unit 23 determines the encoding mode to minimize the cost as the encoding mode for the encoding target macroblock (step S204).

The prediction mode determining unit 23 determines whether or not the encoding target macroblock is determined to be intra-prediction coded (step S205). When the encoding target macroblock is intra-prediction coded (step S205—Yes), the prediction mode determining unit 23 notifies the intra-prediction unit 24, the selector 26 and the entropy coding unit 29 of the determined result.

The intra-prediction unit 24 generates an intra-predicted image based on the referenceable reference blocks (step S206). Then, the intra-prediction unit 24 outputs the intra-predicted image to the selector 26.

On the other hand, when the encoding target macroblock is intra-prediction coded (step S205—No), the prediction mode determining unit 23 determines whether or not the encoding target macroblock is determined to be inter-coded (step S207). When the encoding target macroblock is inter-coded (step S207—Yes), the prediction mode determining unit 23 notifies the motion compensation unit 25, the selector 26 and the entropy coding unit 29 of the determined result to the motion compensation unit 25.

The motion compensation unit 25 calculates a motion vector by, for example, performing the block matching process in a range including the referenceable pixels in the reference region (step S208). The motion compensation unit 25 determines whether or not all of the pixels in the region specified by the motion vector are referenceable (step S209). When part of the pixels in the specified region is unreferenceable (step S209—No), the motion compensation unit 25 calculates the motion compensation parameters (step S210).

Then, the motion compensation unit 25 replaces the values of the unreferenceable pixels by values calculated based on the motion compensation parameters and the pixel values in the referenceable range (step S211).

When, in step S209, all of the pixels in the specified region are referenceable (step S209—Yes), or, after step S211, the motion compensation unit 25 generates a motion-compensated predicted image (step S212). In addition, the motion compensation unit 25 determines a predicted motion vector and the index pmVIdx based on the referenceable blocks (step S213). Then, the motion compensation unit 25 calculates the prediction error between the motion vector and the predicted motion vector. The motion compensation unit 25 outputs the motion-compensated predicted image to the selector 26. Furthermore, the motion compensation unit 25 outputs the motion compensation parameter, the prediction error between the motion vector and the predicted motion vector and the index pmVIdx, to the entropy coding unit 29.

As illustrated in FIG. 19, the prediction error signal generation unit 27 calculates the prediction error of each pixel by subtracting the value of a corresponding pixel in the predicted image received from the selector 26, from the value of each pixel of the encoding target macroblock (step S214). Then, the prediction error signal generation unit 27 outputs the prediction error of each pixel to the orthogonal transform and quantizing unit 28. The orthogonal transform and quantizing unit 28 performs an orthogonal transform and quantization of the prediction errors of the pixels and calculates a set of quantization coefficients (step S215). The orthogonal transform and quantizing unit 28 outputs the set of the quantization coefficients to the entropy coding unit 29 and the inverse-quantizing and orthogonal transform unit 30.

The inverse-quantizing and orthogonal transform unit 30 performs inverse-quantization and an inverse orthogonal transform of the quantization coefficients and reconstructs the prediction error of each pixel (step S216). Then, the inverse-quantizing and orthogonal transform unit 30 outputs the reconstructed prediction errors to the adder 31.

The adder 31 reconstructs the encoding target macroblock as reference data by adding the prediction error of each pixel to the value of a corresponding pixel of the predicted image (step S217). Then, the adder 31 stores the reconstructed macroblock in the image memory 32.

Meanwhile, the entropy coding unit 29 encodes the macroblock data such as the quantization coefficient of the encoding target macroblock, the motion vector, and/or the like, according to a predetermined entropy coding scheme (step S218).

The moving image encoding apparatus 2 determines whether or not all of the macroblocks in the encoding target picture have been encoded (step S219). When there is any macroblock that is not encoded (step S219—No), the moving image encoding apparatus 2 repeats the processes of and after step S202. On the other hand, when all of the macroblocks in the encoding target picture are encoded (step S219—Yes), the entropy coding unit 29 generates encoded moving image data to include circulation direction information and displacement amount information with respect to the clean region boundary (step S220). Then, the moving image encoding apparatus 2 finishes the moving image encoding process. Note that the moving image encoding apparatus 2 may execute the processes of steps S216 and S217 and the process of step S218 in parallel.

As described above, the moving image encoding apparatus according to the present embodiment defines the position of the clean region boundary in each picture of encoded moving image data, according to information that represents the circulation direction of the clean region boundary and the amount of displacement of the clean region boundary. Then, in the encoded moving image data, the moving image encoding apparatus inserts the circulation direction of the clean region boundary and the amount of displacement of the clean region boundary in different positions from the macroblock data of each encoded picture. Consequently, the encoded moving image data which is encoded by the moving image encoding apparatus does not have to include slice headers that indicate the position of the clean region boundary per picture. Furthermore, the information representing the circulation direction of the clean region boundary has only to be inserted once per refresh cycle, in encoded moving image data. The information representing the amount of displacement of the clean region boundary is also placed at the top of the data of each picture. Consequently, since slice headers are not inserted in the middle of encoded data of pictures, even when CABAC is used as the entropy coding scheme, it is possible to reduce the number of times context initialization occurs. Consequently, the moving image encoding apparatus is able to suppress the decrease of the rate of entropy coding. Furthermore, although the motion vectors of blocks that belong to slices other than the slice to which the encoding target block belongs are unable to be referenced, since the slice headers are not included in the middle of encoded data of pictures, this limit is alleviated, and the rate of motion vector prediction improves.

Furthermore, the moving image encoding apparatus is able to define the circulation direction of the clean region boundary freely, only by setting the information representing the circulation direction of the clean region boundary and the information representing the amount of displacement of the clean region boundary. Consequently, for example, by setting the circulation direction of the clean region boundary to substantially match the direction in which the image captured in pictures moves every scene, the possibility that optimal motion vectors can be used improves with respect to the macroblocks in the clean region.

Note that the method of encoding the clean region boundary is by no means limited to the above, and the clean region boundary may be encoded by, for example, encoding the identification information (ID) or the macroblock addresses of all the macroblocks belonging to the clean region by headers. Alternatively, as a clean region boundary encoding method, it is possible to use other general methods to specify regions in images, such as the region classification method defined by the Slice Group provision of flexible macroblock order (FMO) in ITU-T H.264/MPEG-4 AVC, without losing generality.

A computer program that, when executed on a computer, realizes the functions of the individual units of the moving image decoding apparatus and the moving image encoding apparatus according to the above embodiments or modification examples, may be recorded in a recording medium such as a semi-conductor memory or an optical recording medium and distributed. However, a carrier wave does not qualify for the computer readable recording medium.

The moving image decoding apparatus according to the above embodiment or modification examples may be used for various uses. For example, the moving image decoding apparatus may be incorporated in a video camera, a video receiving apparatus, a television telephone system, a computer or a mobile telephone. For example, when the moving image decoding apparatus is incorporated in a video receiving apparatus, encoded moving image data is first generated in a video transmitting apparatus. Then, the encoded moving image data is converted into data streams conforming to a predetermined communication standard, with other signals such as audio signals and/or the like that are acquired with the moving image data at the same time. The data streams are transmitted to the image receiving apparatus included in a remote location via an antenna connected to the output unit of the video transmitting apparatus or via a communication line. Then, the video receiving apparatus incorporating the moving image decoding apparatus extracts the encoded moving image data from the data stream and outputs the encoded moving image to the moving image encoding apparatus. The moving image encoding apparatus decodes and outputs moving images.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present inventions have been described in detail, it should be understood that the various changes, substitutions, and alterations could be made hereto without departing from the spirit and scope of the invention.

What is claimed is:
1. A moving image decoding apparatus for decoding moving image data that is encoded such that a clean region, which includes at least one block that is encoded such that a pixel value is guaranteed to be decoded correctly, occupies an entire picture in a predetermined cycle, the moving image decoding apparatus comprising:
a processor configured to
extract region boundary position information between the clean region and a non-clean region from encoded moving image data;
specify the clean region and the non-clean region in each picture based on the region boundary position information;
determine, when a decoding target block in a decoding target picture included in the encoded moving image data belongs to the clean region, that blocks in the non-clean region in the decoding target picture and blocks in the non-clean region in a reference picture which precedes the decoding target picture in decoding order are unreferenceable and blocks in the clean region in the decoding target picture and blocks in the clean region in the reference picture are referenceable;
determine, when the decoding target block belongs to the non-clean region in the decoding target picture, that all of blocks of the decoding target picture and all of blocks of the reference picture are referenceable; and
decode the decoding target block with reference to only referenceable blocks by executing a filter process of applying a predetermined filter to the reconstructed decoding target block, including, when pixels in the unreferenceable blocks are included in a region which the predetermined filter references, calculating first decoded data to be used to decode another block, by executing the filter process after replacing values of the pixels in the unreferenceable blocks by a value of any of pixels in the referenceable blocks in the region which the filter references.

2. The moving image decoding apparatus according to claim 1, wherein the region boundary position information includes displacement direction information of a region boundary and transition of the region boundary between pictures.

3. The moving image decoding apparatus according to claim 2, wherein the region boundary position information for a first picture included in the encoded moving image data is placed, in the encoded moving image data, before encoded data of each block included in the first picture.

4. The moving image decoding apparatus according to claim 1, wherein decoding of the decoding target block comprises:
generating a first predicted image by applying motion compensation to reference blocks included in the reference region using a motion vector representing motion between the decoding target block and the reference picture, including, when part of pixels of the reference blocks is included in the unreferenceable blocks, generating the first predicted image by calculating values of pixels in the unreferenceable blocks in the reference blocks by correcting the values of the pixels in the reference blocks using a correction value included in the moving image data, and
reconstructing the decoding target block by adding a value of a pixel corresponding to the first predicted image, to a prediction error of each pixel in the decoding target block reconstructed from the encoded moving image data.

5. The moving image decoding apparatus according to claim 4,
wherein the encoded moving image data includes an index representing a method of predicting a motion vector of the decoding target block and a prediction error of the motion vector, and
wherein the processor is further configured to
determine referenceable blocks which the decoding target block can reference, in a second reference range including a plurality of blocks having a possibility of being referenced in order to determine a predicted value of the motion vector of the decoding target block,
determine the predicted value of the motion vector based on the referenceable blocks and the index, and
reconstruct the motion vector by adding the prediction error of the motion vector to the predicted value of the motion vector.

6. The moving image decoding apparatus according to claim 1, wherein decoding of the decoding target block comprises:
generating a second predicted image using pixel values in a block neighboring the decoding target block, when the neighboring block is a referenceable block, and not generating the second predicted image when the neighboring block is an unreferenceable block, and
reconstructing the decoding target block, only when the second predicted image is generated, by adding a value of a corresponding pixel of the second predicted image to the prediction error of each pixel in the decoding target block reconstructed from the encoded moving image data.

7. The moving image decoding apparatus according to claim 1, wherein, even when the pixels in the unreferenceable blocks are included in the region which the predetermined filter references, the executing of the filter process calculates the second decoded data for display by executing the filter process using all of pixel values in the region which the filter references.

8. A moving image decoding method for decoding moving image data that is encoded such that a clean region, which includes at least one block that is encoded such that a pixel value is guaranteed to be decoded correctly, occupies an entire picture in a predetermined cycle, the moving image decoding method comprising:
extracting region boundary position information between the clean region and a non-clean region from encoded moving image data;
specifying the clean region and the non-clean region in each picture based on the region boundary position information;
determining, when a decoding target block in a decoding target picture included in the encoded moving image data belongs to the clean region, that blocks in the non-clean region in the decoding target picture and blocks in the non-clean region in a reference picture which precedes the decoding target picture in decoding order are unreferenceable and blocks in the clean region in the decoding target picture and blocks in the clean region in the reference picture are referenceable;
determining, when the decoding target block belongs to the non-clean region in the decoding target picture, that all of blocks of the decoding target picture and all of blocks of the reference picture are referenceable; and
decoding the decoding target block with reference to only referenceable blocks by executing a filter process of applying a predetermined filter to the reconstructed decoding target block, including, when pixels in the unreferenceable blocks are included in a region which the predetermined filter references, calculating first decoded data to be used to decode another block, by executing the filter process after replacing values of the pixels in the unreferenceable blocks by a value of any of pixels in the referenceable blocks in the region which the filter references.

9. The moving image decoding method according to claim 8, wherein the region boundary position information includes displacement direction information of a region boundary and transition of the region boundary between pictures.

10. The moving image decoding method according to claim 9, wherein the region boundary position information for a first picture included in the encoded moving image data is placed, in the encoded moving image data, before encoded data of each block included in the first picture.

11. The moving image decoding method according to claim 8, wherein
the decoding the decoding target block comprises, generating a first predicted image by applying motion compensation to reference blocks included in the reference region, using a motion vector representing motion between the decoding target block and the reference picture, wherein
the generating the first predicted image generates the first predicted image by calculating values of pixels in the unreferenceable blocks in the reference blocks by correcting the values of the pixels in the reference blocks using a correction value included in the moving image data, when part of pixels of the reference blocks is included in the unreferenceable blocks, and
the decoding the decoding target block reconstructs the decoding target block by adding a value of a pixel corresponding to the first predicted image, to a prediction error of each pixel in the decoding target block reconstructed from the encoded moving image data.

12. The moving image decoding method according to claim 11, further comprising:
determining the referenceable blocks which the decoding target block can reference, in a second reference range including a plurality of blocks having a possibility of being referenced in order to determine a predicted value of the motion vector of the decoding target block, and
wherein
the encoded moving image data includes an index representing a method of predicting a motion vector of the decoding target block and a prediction error of the motion vector, and
the generating the first predicted image determines the predicted value of the motion vector based on the referenceable blocks and the index, and reconstructs the motion vector by adding the prediction error of the motion vector to the predicted value of the motion vector.

13. The moving image decoding method according to claim 8, wherein
the decoding the decoding target block comprises generating a second predicted image using pixel values in a block neighboring the decoding target block, wherein
the generating a second predicted image generates the second predicted image when the neighboring block is a referenceable block, and does not generate the second predicted image when the neighboring block is an unreferenceable block, and
only when the second predicted image is generated, the decoding the decoding target block reconstructs the decoding target block by adding a value of a corresponding pixel of the second predicted image to the prediction error of each pixel in the decoding target block reconstructed from the encoded moving image data.

14. The moving image method according to claim 8, wherein, even when the pixels in the unreferenceable blocks are included in the region which the predetermined filter references, the executing the filter process calculates the second decoded data for display by executing the filter process using all of pixel values in the region which the filter references.

15. A moving image encoding apparatus for encoding moving image data such that a clean region, which includes at least one block that is encoded such that a pixel value is guaranteed to be decoded correctly, occupies an entire picture in a predetermined cycle, the moving image encoding apparatus comprising:
a processor configured to
determine the clean region and a non-clean region in the picture;
determine, when an encoding target block in an encoding target picture belongs to the clean region, that blocks in the non-clean region in the encoding target picture and blocks in the non-clean region in a reference picture which precedes the encoding target picture in encoding order are unreferenceable and blocks in the clean region in the encoding target picture and blocks in the clean region in the reference picture are referenceable,
determine, when the encoding target block belongs to the non-clean region in the encoding target picture, that all of blocks of the encoding target picture and all of blocks of the reference picture are referenceable,
encode the encoding target block with reference to only referenceable blocks by reconstructing the encoded target block to execute a filter process of applying a predetermined filter to the reconstructed encoding target block, including, when pixels in the unreferenceable blocks are included in a region which the predetermined filter references, calculating first reference data to be used to encode another block, by executing the filter process after replacing values of the pixels in the unreferenceable blocks by a value of any of pixels in the referenceable blocks in the region which the filter references, and
add region boundary position information representing a boundary between the clean region and the non-clean region to the encoded moving image data.

16. A moving image encoding method for encoding moving image data such that a clean region, which includes at least one block that is encoded such that a pixel value is guaranteed to be decoded correctly, occupies an entire picture in a predetermined cycle, the moving image encoding method comprising:
determining the clean region and a non-clean region in the picture;
determining, when an encoding target block in an encoding target picture belongs to the clean region, that blocks in a non-clean region in the encoding target picture and blocks in a non-clean region in a reference picture which precedes the encoding target picture in encoding order are unreferenceable and blocks in the clean region in the encoding target picture and blocks in the clean region in the reference picture are referenceable;
determining, when the encoding target block belongs to the non-clean region in the encoding target picture, that all of blocks of the encoding target picture and all of blocks of the reference picture are referenceable;
encoding the encoding target block with reference to only referenceable blocks by reconstructing the encoded target block to execute a filter process of applying a predetermined filter to the reconstructed encoding target block, including, when pixels in the unreferenceable blocks are included in a region which the predetermined filter references, calculating first reference data to be used to encode another block, by executing the filter process after replacing values of the pixels in the unreferenceable blocks by a value of any of pixels in the referenceable blocks in the region which the filter references; and
adding region boundary position information representing a boundary between the clean region and the non-clean region to the encoded moving image data.

* * * * *